(12) United States Patent
Yamashita et al.

(10) Patent No.: US 6,269,305 B1
(45) Date of Patent: Jul. 31, 2001

(54) NAVIGATION DEVICE

(75) Inventors: Atsushi Yamashita, Osaka; Kiyomi Sakamoto, Ikoma; Teruaki Ata, Osaka, all of (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/537,870

(22) Filed: Mar. 29, 2000

(30) Foreign Application Priority Data

Mar. 30, 1999 (JP) .................................................. 11-089573

(51) Int. Cl.[7] .................................................. G06F 165/00
(52) U.S. Cl. ........................ 701/211; 701/207; 701/208; 701/209
(58) Field of Search .................................... 701/201, 207, 701/209, 208, 210, 214, 215, 216; 340/988, 990, 995, 905; 73/178 R

(56) References Cited

U.S. PATENT DOCUMENTS

| 5,206,811 | 4/1993 | Itoh et al. | ............................. 701/211 |
| 5,684,704 | 11/1997 | Okazaki | ............................. 701/208 |
| 5,757,289 | * 5/1998 | Nimura et al. | ............................. 340/995 |
| 6,018,697 | * 1/2000 | Morimoto et al. | ............................. 701/209 |
| 6,893,045 | * 4/1999 | Kusama et al. | ............................. 701/211 |

FOREIGN PATENT DOCUMENTS

| 0803853 | 10/1997 | (EP) . |
| 7-129889 | 5/1995 | (JP) . |

\* cited by examiner

*Primary Examiner*—William A. Cuchlinski, Jr.
*Assistant Examiner*—Marthe Y. Marc-Coleman
(74) *Attorney, Agent, or Firm*—Wenderoth, Lind & Ponack, L.L.P.

(57) ABSTRACT

A path search part searches for an optimal guidance path between any two locations arbitrarily designated on map data. A lane guidance information generation part divides the path searched in the path search part at intersections into a plurality of between-intersection roads. The lane guidance information generation part then generates lane guidance information by referring to the map data corresponding to each of the between-intersection roads. Herein, exit lanes of the between-intersection roads are each restricted by heading direction control written on the map data. If the exit lane corresponding to the next between-intersection are found plural, the lane guidance information generation part further refers to another between-intersection road located next. In this manner, it becomes possible to provide the lane guidance information with consideration for not only the closest intersection but some more intersections ahead.

28 Claims, 19 Drawing Sheets

F I G. 16
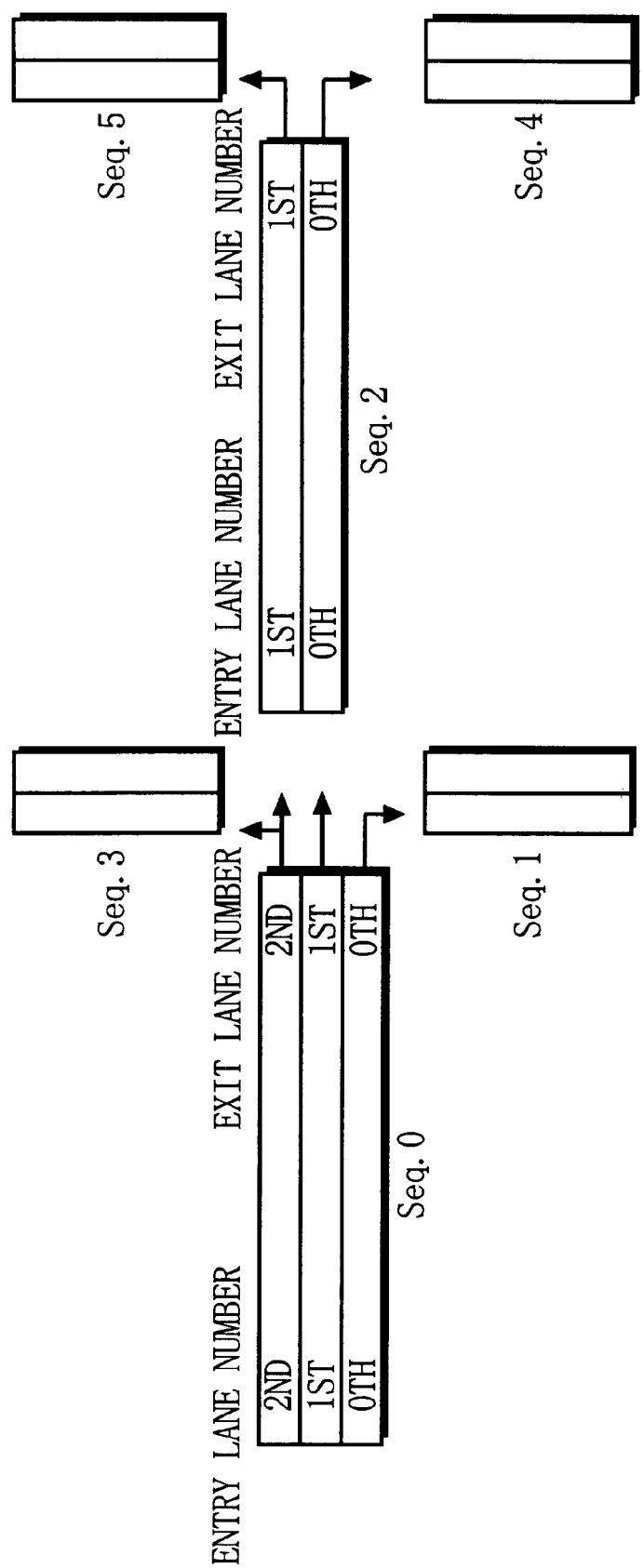

FIG. 17

| BETWEEN-INTERSECTION ROAD | LANE SELECTION CONDITION | ENTRY, EXIT LANE |
|---|---|---|
| Seq. 0 | Seq. 1 | 0, 0 |
| | Seq. 4 | 1, 1 |
| | Seq. 5 | 2, 2 |
| | Seq. 3 | 2, 2 |
| Seq. 2 | Seq. 4 | 0, 0 |
| | Seq. 5 | 1, 1 |

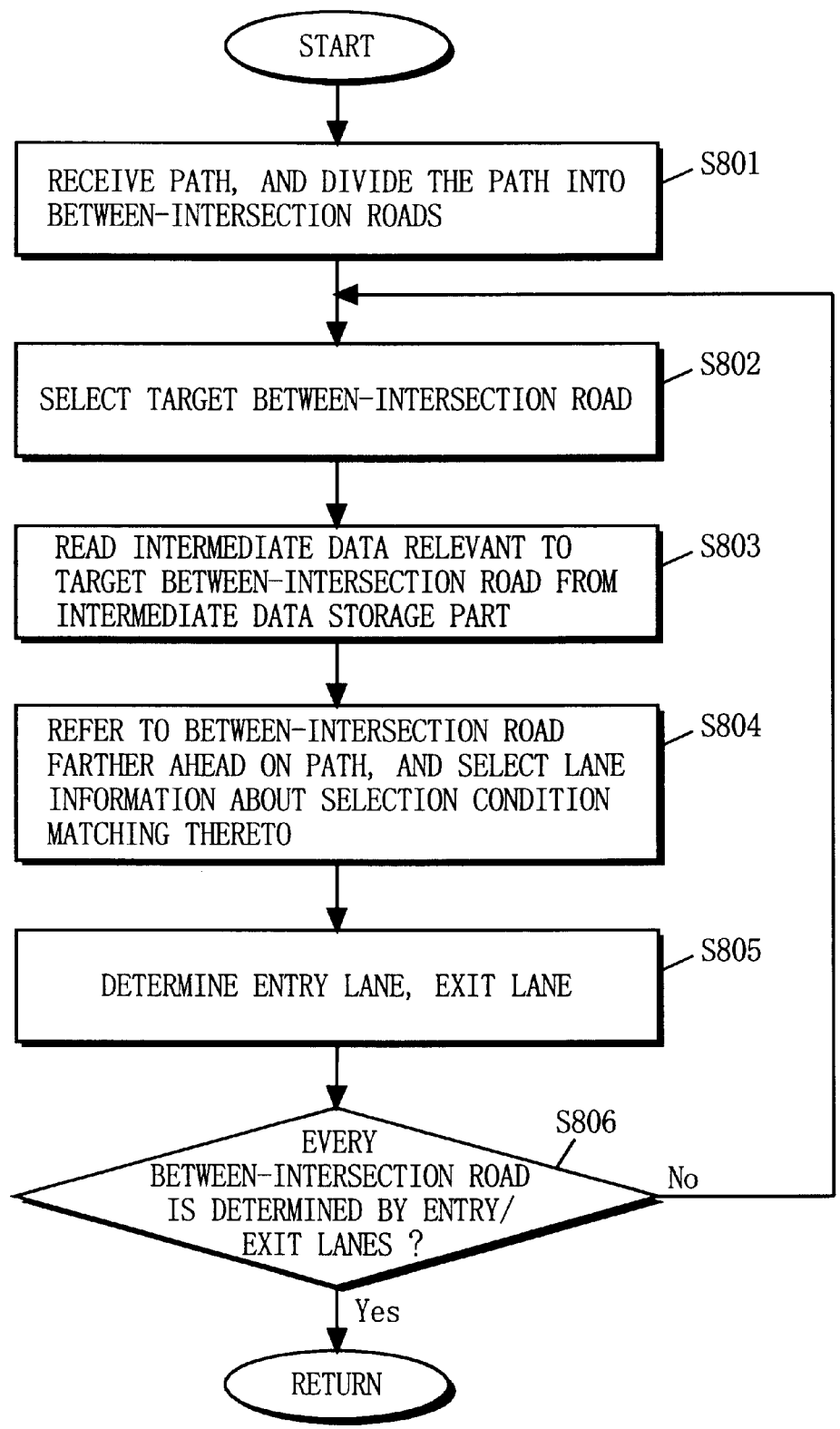

NAVIGATION DEVICE

BACKGROUND OF THE INVENTION

1. Field of the Invention

The present invention relates to navigation devices, more particularly to a navigation device of a type additionally advising a car which lane to take when guiding a way between any two locations arbitrarily designated on a map.

2. Description of the Background Art

A conventional navigation device commonly presents path information road by road to a driver. However, for safe and correct guidance of right/left turn at intersection or which road to take, path information road by road is not enough without information on lane change. This is because, even when the driver is on the right path, lane control may prevent him/her from heading for his/her destination, for example.

Accordingly, in recent years, various types of navigation devices capable of additionally guiding lanes have been developed. A typical conventional method of guiding lanes is lane graphical display. In this lane graphical display, for example, road link data directly linked to intersection nodes on a two-dimensional map is each manually provided in advance with the number of lanes and lane control information. When the car reaches a predetermined distance range of an intersection where the car is supposed to pass by, the lanes at the intersection are graphically displayed, and lane guidance information is also presented to the driver in accordance with the lane control information for the intersection.

The problem herein is, in the lane guidance information of the conventional navigation device, only path information and the number of lanes at the closest intersection are taken into consideration. Therefore, in a case where complicated-shaped intersections come along one after another, improper lane guidance information (i.e., lane change cannot be smoothly done) is often presented to the driver. This is because, for the driver to smoothly change lanes, it is not enough to concern about heading direction, the number of lanes, and lane control only at the closest intersection, but is necessary to concern about those at one or more intersections ahead. For example, when the car is on a three-lane road, and is supposed to go straight at the closest intersection and then turns left at the following intersection, it is easier for the driver to drive on a left lane to go along the path.

SUMMARY OF THE INVENTION

Therefore, an object of the present invention is to provide a navigation device of a type always offering proper lane guidance with consideration for circumstances not only at the closest but some more intersections ahead of the path.

The present invention has the following features to attain the object above.

A first aspect of the present invention is directed to a navigation device of a type guiding a car between any two locations arbitrarily designated on a map. In this navigation device, a guidance path between the two locations designated on the map is searched according to map data stored in a map data storage part. According to the map data, lane guidance information for the car about which lane to take on the guidance path is also generated. Moreover, according to the searched guidance path and the generated lane guidance information, guidance information relevant to path and lane is generated. Thereafter, the generated guidance information is outputted perceivably for a driver. The lane guidance information is generated in the following manner. First, the guidance path is divided at intersections so that the path is taken in as a plurality of between-intersection roads. Next, the between-intersection roads on the guidance path are selected one by one for a target between-intersection road, and the map data is referred to on the between-intersection road basis, whereby the selected target between-intersection road is determined by lane. Herein, reference to the map data for lane determination is kept on making, one by one, from the selected target between-intersection road to other between-intersection roads ahead on the guidance path until the target between-intersection road can be judged as being uniquely determined by lane. As is known from this, if reference to the corresponding map data is not enough to uniquely determine the target between-intersection road by lane, the map data corresponding to one or more between-intersection roads ahead on the guidance path is also referred to. In this manner, even when complicated-shaped intersections come along one after another in the limited range, lane guidance information relevant also to heading direction at one or more intersections ahead becomes available, and lane guidance can be carried out in a thoughtful manner for the driver.

The judgement whether or not the selected target between-intersection road can be uniquely determined by lane is made as follows. In detail, every time reference to the map data is made to any other between-intersection road located next, any exit lane ensuring the car of travel thereto is extracted from the between-intersection road one before. Then, when the number of extracted exit lanes is limited to one, it is judged that the target between-intersection road can be uniquely determined by lane. The exit lane determination accordingly leads to unique entry lane determination. Therefore, by tracing the extracted exit lanes from the between-intersection road lastly referred to back to the target between-intersection road, the target between-intersection road can be uniquely determined by entry/exit lanes.

In the present invention, preferably, an upper limit of reference frequency is predetermined with respect to the between-intersection roads, and when the reference frequency reaches its upper limit, reference to the map data is thus stopped. Thereafter, one exit lane ensuring travel to the between-intersection road located furthermost when reference to the map data is stopped is forcefully selected out of the exit lanes of the between-intersection road one before. In this manner, an endless loop for the lane determination processing can be prevented.

The map data may include both the between-intersection roads with the heading direction control set to the exit lanes and those without. If this is the case, the between-intersection roads without the heading direction control are detected so that default heading direction control is set to the exit lanes thereof. In this manner, every between-intersection road can be determined by lane.

The default heading direction control is provided in the following manner, for example. First, as to the between-intersection road without the heading direction control set, any branch road assumable to be straight-forward is specified among the ones connected thereto. Next, with reference thereto, the exit lanes of the between-intersection road without the heading direction control are each assigned to the branch roads. Herein, the branch road assumable to be straight-forward is the one whose connection angle with respect to the between-intersection road without the heading direction control is within a predetermined range, which shows the least difference in the number of lanes compared with the exit lanes thereof, and whose connection angle with respect thereto is closest to 180 degrees. In this manner, the branch road ensuring the smoothest travel is selected as the branch road assumable to be straight-forward. Herein, when the exit lanes of the between-intersection road without the heading direction control are each assigned to the branch roads, the method thereof may be changed depending on the number of branch roads connected thereto being larger or smaller compared with the number of exit lanes thereof. Accordingly, the heading direction control can be set in an elaborating manner.

A second aspect of the present invention is directed to a method of determining a lane for a car to take when the car is guided along a guidance path searched on map data. The lane determination technique used in the second aspect is substantially similar to the one described in the first aspect.

A third aspect of the present invention is directed to a recording medium on which a program run on a navigation device and for determining a lane for a car to take when the navigation device guides the car along a guidance path searched on map data is recorded. The lane determination technique used in the third aspect is substantially similar to the one described in the first aspect.

In the above-described first to third aspects, since every operation processing for lane determination is carried out in the navigation device, processing load to be imposed on a CPU thereof is consequently increased. For betterment, in a fourth and a fifth aspects next below, the map data is externally analyzed in advance, and the analysis result is then installed on the navigation device as intermediate data. The navigation device refers to the installed intermediate data so as to determine the between-intersection roads on the guidance path by lane. In this manner, the navigation device has no more need to carry out such heavy-loaded operation processing for lane determination.

The fourth aspect of the present invention is directed to an intermediate data generation device to determine a lane for a car to take when the navigation device guides the car along a path searched. In the intermediate data generation device, a road network on map data is divided at intersections so that the road network is taken in as a collection of a plurality of between-intersection roads. Next, the between-intersection roads on the map data are selected one by one for a target between-intersection road, and the map data each corresponding to the selected target between-intersection road and other between-intersection roads therearound is referred to, whereby a lane selection condition for the target between-intersection road and a lane corresponding thereto are determined. Herein, when the lane selection conditions and the lane corresponding thereto are determined, reference to the map data is gradually kept on making from the target between-intersection road to other between-intersection roads therearound. Then, when the target between-intersection road can be judged as being uniquely determined by lane, the between-intersection road lastly referred to is determined as the lane selection condition therefor, and a lane satisfying the conditions is accordingly determined. Note that, the details of the preferable embodiment in the fourth aspect are substantially similar to the ones described in the first aspect.

The fifth aspect of the present invention is directed to a navigation device of a type guiding a car between any two locations arbitrarily designated on a map. The navigation device determines each between-intersection road by lane according to such intermediate data generated by the intermediate data generation device as described in the fourth aspect. In the navigation device, since the intermediate data is enough for lane determination, load to be imposed on the CPU is accordingly eased without complicated operation processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a diagram showing an exemplary network of the between-intersection roads;

FIG. 17 is a diagram showing an exemplary intermediate data setting table;

FIG. 19 is a flowchart illustrating how a lane selection part 8 in FIG. 18 is operated.

DESCRIPTION OF THE PREFERRED EMBODIMENTS (First Embodiment)

Figure 1:
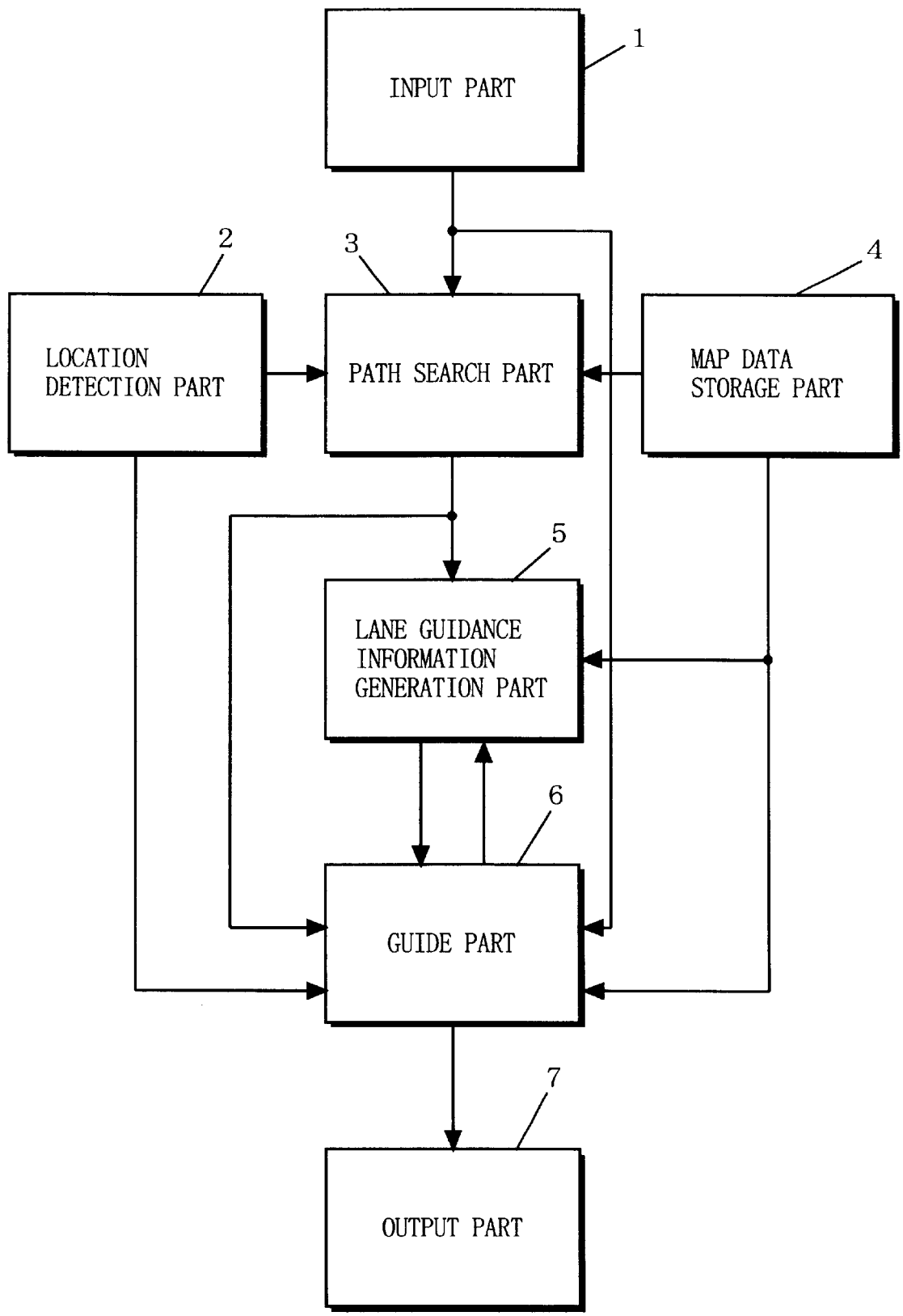
FIG. 1 is a block diagram showing the structure of a navigation device according to a first embodiment of the present invention.

FIG. 1 is a block diagram showing the structure of a navigation device according to a first embodiment of the present invention. In FIG. 1, the navigation device is provided with an input part 1, a location detection part 2, a path search part 3, a map data storage part 4, a lane guidance information generation part 5, a guide part 6, and an output part 7.

The input part 1 is structured by a remote controller, touch sensor, keyboard, mouse, or the like, and is actuated by a driver for selecting functions of the navigation device (e.g., processing item change, map selection, layer change), setting location, or selecting search modes, for example. The input part 1 outputs instruction information to the path search part 3 and the guide part 6.

The location detection part 2 is structured by a GPS, radio wave beacon receiver, speed sensor, angular velocity sensor, absolute azimuth sensor, or the like, and detects the present car location. The location detection part 2 provides present car location information to the path search part 3 and the guide part 6.

The map data storage part 4 is structured by an optical disk (e.g., CD, DVD), hard disk, large-capacity semiconductor memory, or the like, and stores information relevant to a road network such as connection, coordinates, shape, attribute, or control information as to intersections and roads. Map data stored in the map data storage part 4 is read, as appropriate, by the path search part 3, the lane guidance information generation part 5, and the guide part 6 for use. Herein, the map data stored in the map data storage part 4 may be either 2D map data or 3D map data. Herein, the map data presumably includes the number of lanes of each road and control information on heading direction for each lane.

The path search part 3 reads the map data in a necessary range from the map data storage part 4 according to the instruction information provided from the input part 1. The path search part 3 then determines a departing point and a destination in accordance with the instruction information such as location information provided from the input part 1 and the present car location information provided from the location detection part 2, and then searches for a path at a minimum cost between the departing point and the destination while taking intersection traffic control and one-way traffic control into consideration. Herein, cost means time or distance. The path information provided from the path search part 3 is forwarded to the lane guidance information generation part 5 and the guide part 6.

The lane guidance information generation part 5 performs operation processing in a predetermined manner with respect to the path information provided from the path search part 3 and the map data provided from the map data storage part 4 so as to generate lane guidance information. The generated lane guidance information is provided to the guide part 6.

The guide part 6 generates guidance information for guiding the way to destination in accordance with the path information provided from the path search part 3, the lane guidance information from the lane guidance information generation part 5, the car location information from the location detection part 2, and the map data from the map data storage part 4. The generated guidance information is provided to the output part 7.

The output part 7 includes a display device (e.g., liquid crystal display, CRT display) and a speaker, and displays images and outputs sound for guidance in accordance with the guidance information provided from the guide part 6.

Next, the comprehensive operation of the navigation device shown in FIG. 1 is described. First, the driver designates a path search mode through the input part 1, and then sets a destination. In response to the path search mode designated through the input part 1, the path search part 3 receives the destination set from the input part 1 and receives the present car location information from the location detection part 2 so as to set the present car location as a departing position. Next, the path search part 3 reads the map data in a range covering both the departing position and the destination from the map data storage part 4. Then, on the read map data, the path search part 3 searches for a guidance path between the departing position and the destination (e.g., the shortest time path or the shortest distance path). Note that, an algorithm for the path search carried out in the path search part 3 includes a well-known Dykstra method, for example. After the path search is completed, the path search part 3 forwards the searched path information to the lane guidance information generation part 5 and the guide part 6. The guide part 6 stores the received path information, while the lane guidance information generation part 5 reads the map data identical to the map data read by the path search part 3 from the map data storage part 4, and then generates lane guidance information on the basis of the read map data and the path searched in the path search part 3 for storage.

Next, the driver designates a guidance mode through the input part 1. In response to the guidance mode provided from the input part 1, the guide part 6 generates guidance information for path guidance on the map in accordance with the path information provided from the path search part 3, the car location information from the location detection part 2, and the map data from the map data storage part 4. When the present car location gets nearer to an intersection on the path, the guide part 6 reads the corresponding lane guidance information from the lane guidance information generation part 5, and then generates guidance information for guiding lanes. The guidance information generated in the guide part 6 is provided to the output part 7. The output part 7 displays images and outputs sound for guidance according to the guidance information provided from the guide part 6.

Figure 2:
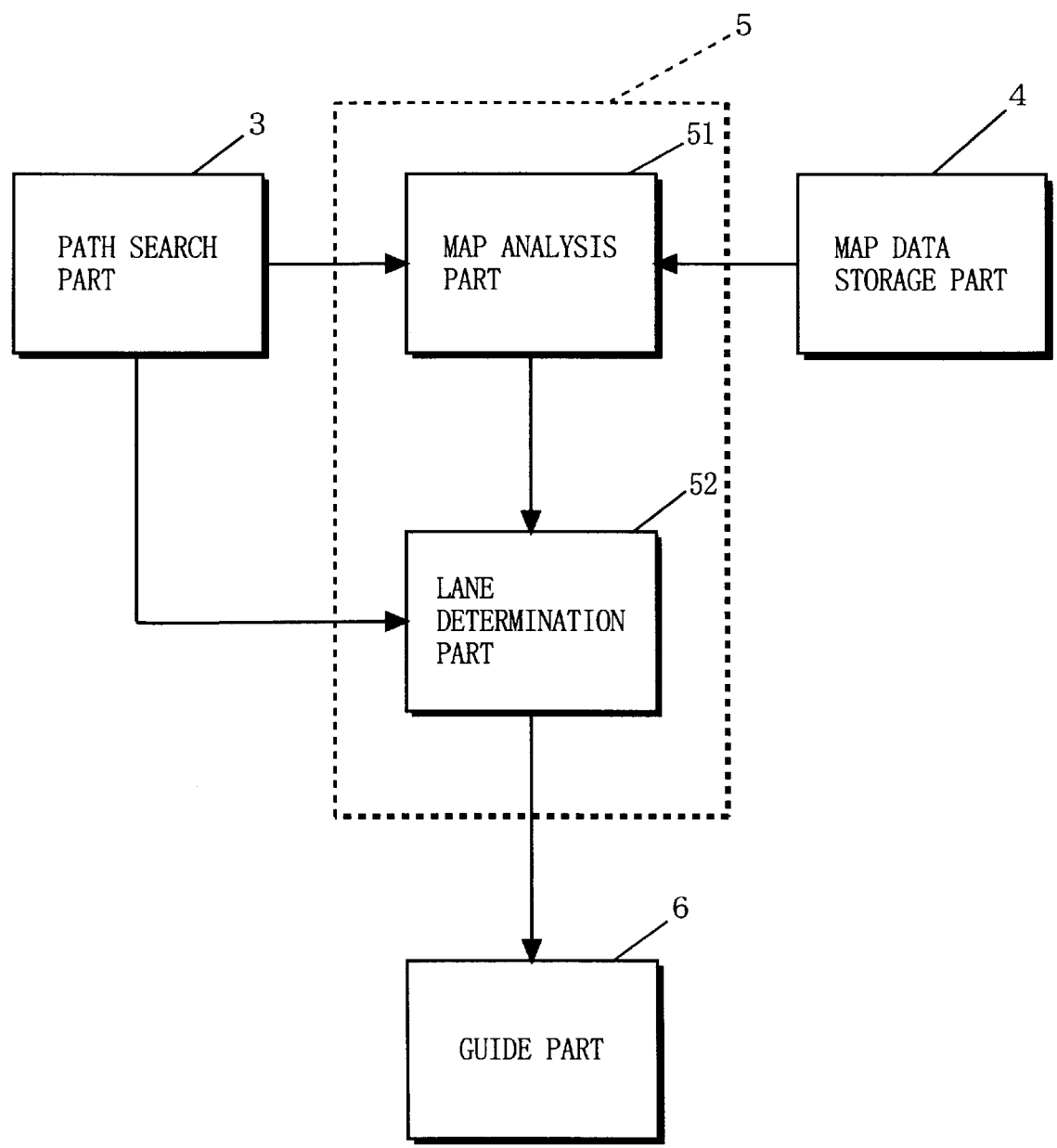
FIG. 2 is a block diagram showing the detailed structure of a lane guidance information generation part 5 in the navigation device in FIG. 1.

FIG. 2 is a block diagram showing the detailed structure of the lane guidance information generation part 5 in the navigation device in FIG. 1. In FIG. 2, the lane guidance information generation part 5 includes a map analysis part 51 and a lane determination part 52.

FIGS. 3 to 7 are flowcharts each illustrating how the lane guidance information generation part 5 in FIG. 1 is operated. Hereinafter, by referring to FIGS. 2 to 7, the operation of the lane guidance information generation part 5 is described.

Figure 3:
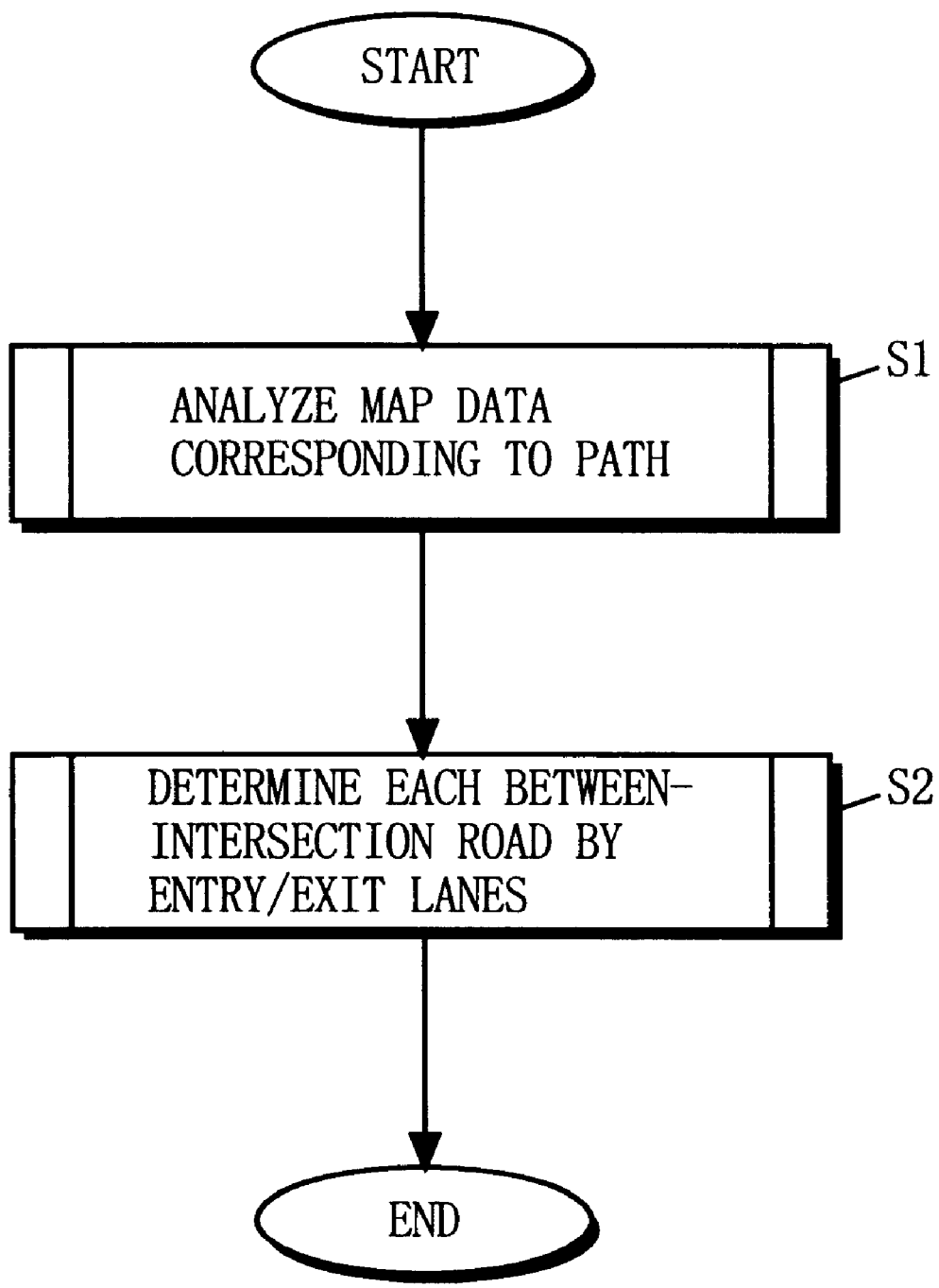
FIG. 3 is a main flowchart illustrating how the lane guidance information generation part 5 in FIG. 1 is operated.

First, in step S1 in FIG. 3, the map analysis part 51 reads the map data, from the map data storage part 4, in the vicinity of the path searched in the path search part 3 for analysis. At this time, the searched path is divided into a plurality of between-intersection roads (roadbetween adjacent intersections, or road between intersection and dead end), and a straight-forward branch road is specified among roads branching off from each exit lane thereof. As to any between-intersection road having no heading direction control set, default heading direction control is set. The map analysis part 51 outputs analysis result to the lane determination part 52. The lane determination part 52 determines entry/exit lanes which ensure the car of smooth travel for each of the between-intersection roads on the path in accordance with the path information provided from the path search part 3 and the analysis result provided from the map analysis part 51 (step S2). The determined entry/exit lane information is provided to the guide part 6.

Figure 4:
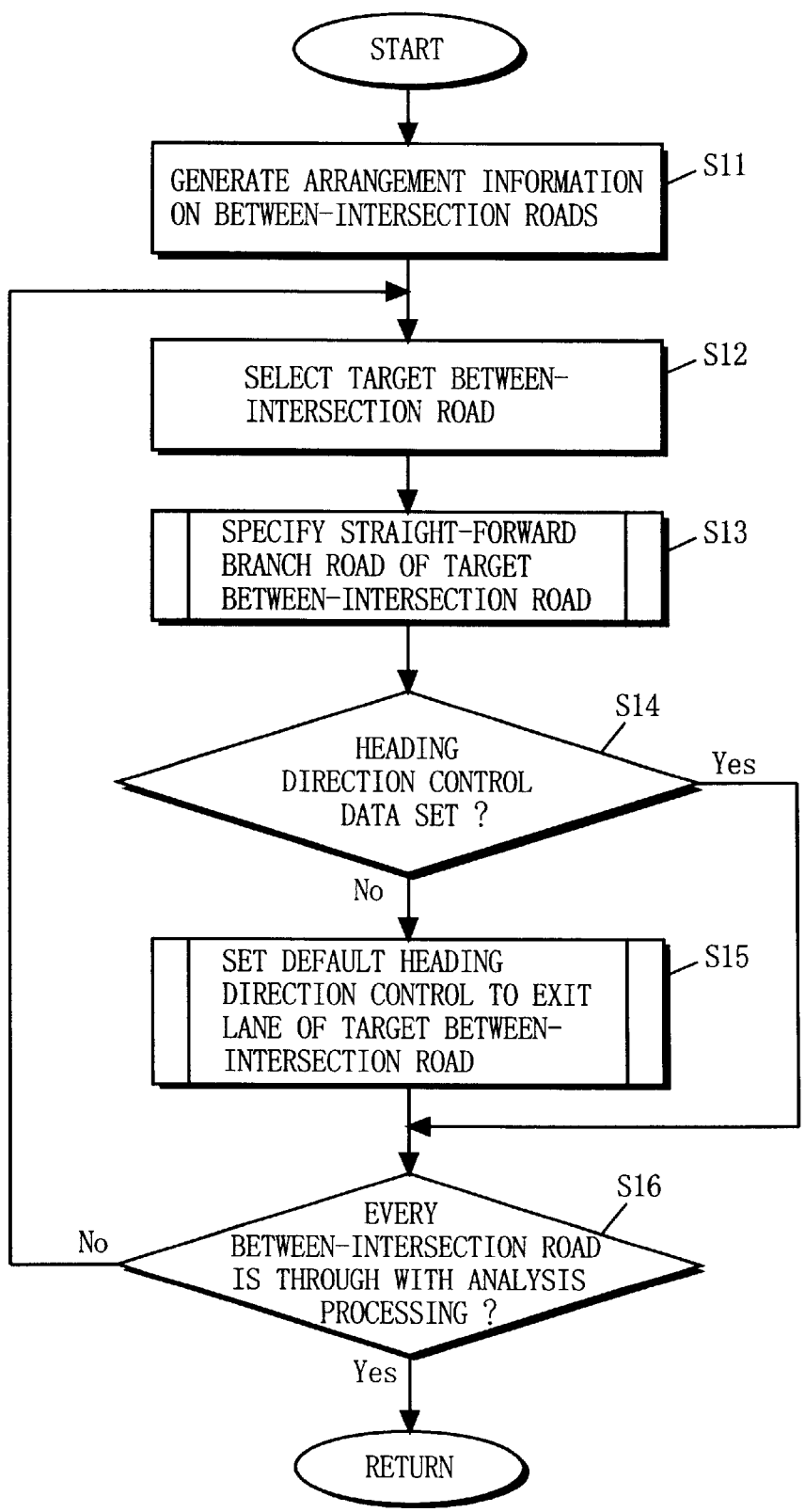
FIG. 4 is a flowchart illustrating subroutine step S1 (map data analysis processing) in FIG. 3 in more detail.

FIG. 4 is a detailed flowchart illustrating subroutine step S1 (map data analysis processing) in FIG. 3. Hereinafter, by referring to FIG. 4, the operation of subroutine step S1 is described in more detail.

First, in step S11 in FIG. 4, the map analysis part 51 divides the searched path at intersections according to the map data read from the map data storage part 4 and the path information provided from the path search part 3 so as to generate arrangement information on the between-intersection roads. Next, the map analysis part 51 selects one between-intersection road targeted among the between-intersection roads on the path (hereinafter, referred to as target between-intersection road) (step S12). The road selected first is a first between-intersection road (that is, a between-intersection road closest to the departing point). The map analysis part 51 then specifies any branch road assumable to be straight-forward among other roads branching off from the exit lanes of the target between-intersection road (step S13). The reason of specifying any branch road assumable to be straight-forward is to later determine a branch road for left turn and that for right turn with reference thereto. Thereafter, the map analysis part 51 judges whether or not the exit lanes of the target between-intersection road has the heading direction control set on the map data (step S14). If not, with the help of an empirical rule, the map analysis part 51 sets default heading direction control thereto (step S15). If yes, the procedure skips step S15. Then, the map analysis part 51 judges whether or not every between-intersection road on the path is through with the analysis processing (step S16). If not yet, the procedure returns to step S12, and the map analysis part 51 selects another target between-intersection road among those not-yet-done with the analysis processing, and then executes the analysis processing thereto in a similar manner to the above. Thereafter, steps S12 to S15 are repeated until every between-intersection road on the path is done with the analysis processing, and the map analysis part 51 is now through with step S1.

Figure 5:
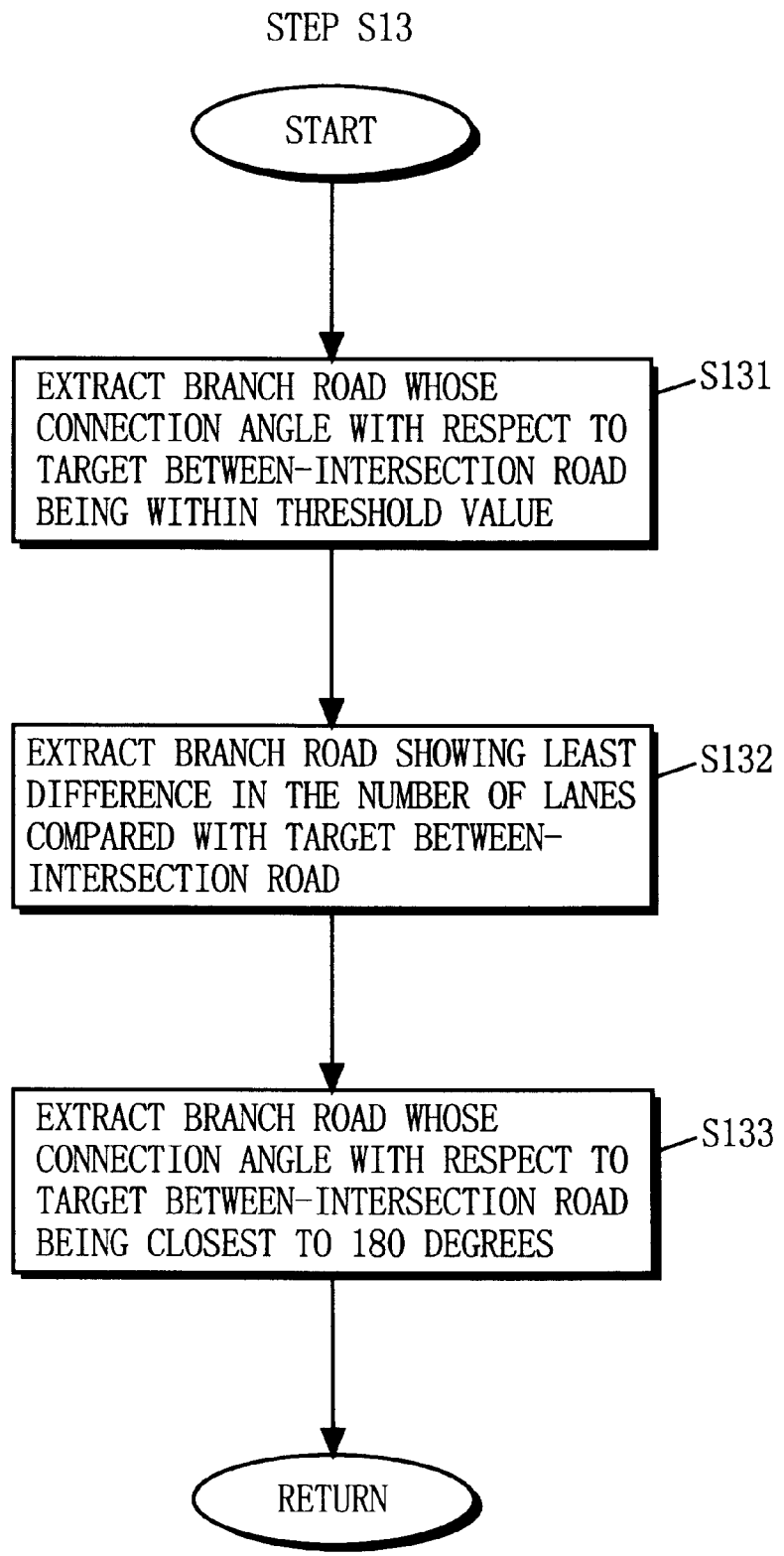
FIG. 5 is a flowchart illustrating subroutine step S13 (straight-forward branch road specification processing) in FIG. 4 in more detail.

FIG. 5 is a detailed flowchart illustrating subroutine step S13 (straight-forward branch road specification processing) in FIG. 4. Hereinafter, by referring to FIG. 5, the operation of subroutine step S13 is described in more detail.

First, in step S131 in FIG. 5, the map analysis part 51 extracts, among the roads branching off from the exit lanes of the target between-intersection road (i.e., between-intersection road selected in step S12), any branch road observed in an angle range of 180±α (e.g., α is 45 degrees) with respect to the target between-intersection road. Thereafter, the map analysis part 51 further extracts, among the branch roads extracted in step S131, any branch road which shows the least difference in the number of lanes compared with the target between-intersection road (step S132). Since this extraction may yet result in a plurality of branch roads being selected, the map analysis part 51 selects, among the branch roads extracted in step S132, a branch road whose connection angle with respect to the target between-intersection road being closest to 180 degrees as a possibility for the straight-forward branch road (step S133). In this manner, a single branch road is eventually selected as a possibility for the straight-forward branch road. Note that, steps S131 to S133 are sequentially carried out with respect to each of the between-intersection roads on the searched path.

Figure 6:
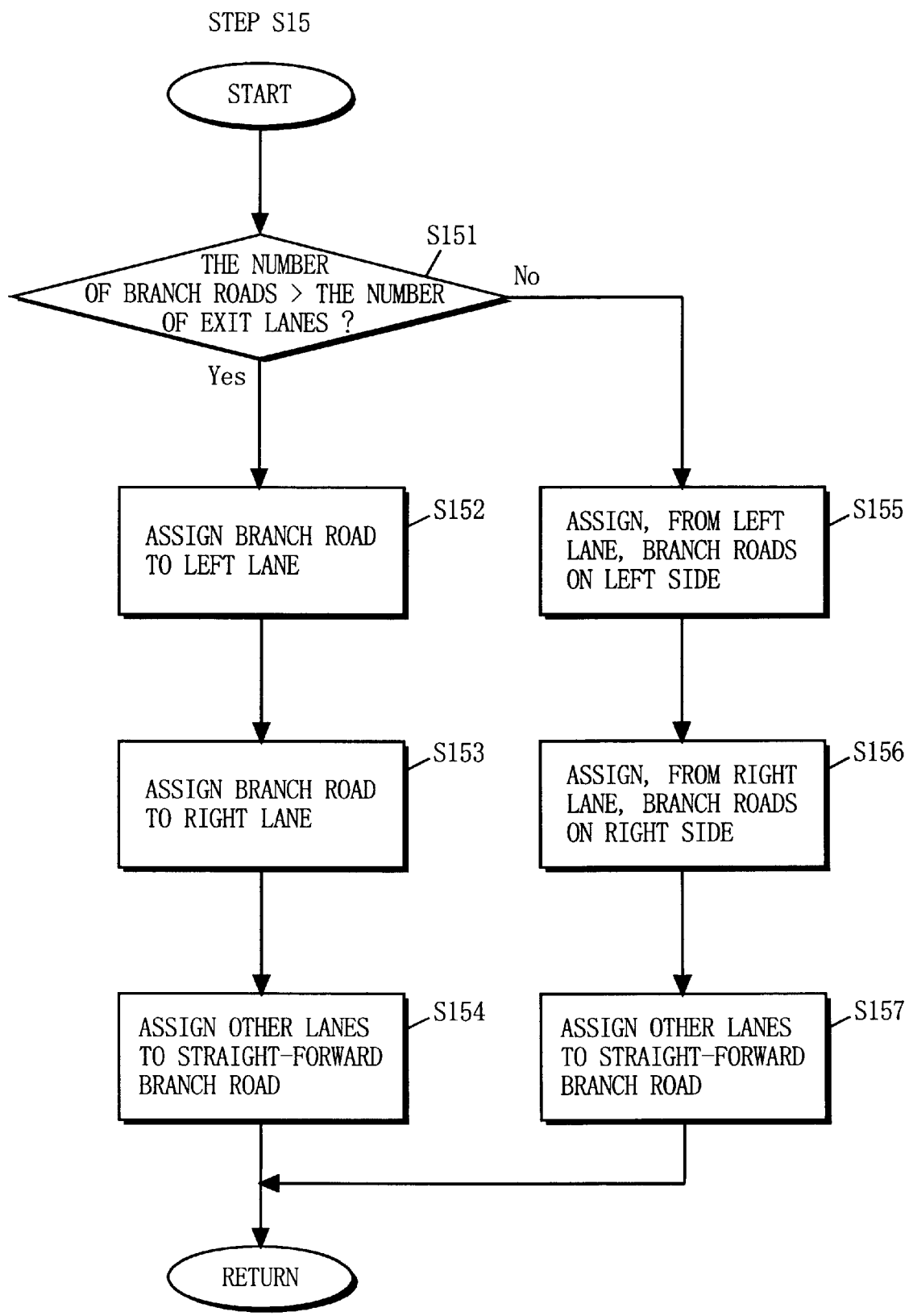
FIG. 6 is a flowchart illustrating subroutine step S15 (heading direction control setting processing) in FIG. 4 in more detail.

FIG. 6 is a detailed flowchart illustrating subroutine step S15 (heading direction control setting processing) in FIG. 4. Hereinafter, by referring to FIG. 6, the operation of subroutine step S15 is described in more detail.

First, in step S151, the map analysis part 51 judges whether or not the number of roads branching off from the exit lanes of the target between-intersection road is larger than the number of exit lanes thereof. If yes, the map analysis part 51 assigns predetermined branch roads to the left-end lane among the exit lanes of the target between-intersection road (step S152). The branch road assigned to the left-end lane herein includes the one judged as being the possibility for the straight-forward branch road in step S13 and any others located on the left thereof. Next, the map analysis part 51 assigns predetermined branch roads to the right-end lane among the exit lanes of the target between-intersection road (step S153). Herein, every branch road located on the right of the branch road being judged as the possibility for the straight-forward branch road in step S13 is assigned to the right-end lane. The map analysis part 51 then assigns the rest of the exit lanes to the branch road being judged as the possibility for the straight-forward branch road in step S13 (step S154). In this manner, when the number of branch roads is larger than the number of exit lanes, the heading direction control is set to every lane.

On the other hand, when the number of branch roads branching off from the exit lanes of the target between-intersection road is equal to or smaller than the number of exit lanes thereof, the map analysis part 51 assigns the exit lanes, one by one from the left-end lane, to the branch roads located on the left of the branch road being judged as the possibility for the straight-forward branch road in step S13 (step S155). Then, the map analysis part 51 assigns, one by one from the right-end lane, the exit lanes to the branch roads located on the right thereof (step S156). The map analysis part 51 lastly assigns the rest of the lanes to the branch road being judged as the possibility for the straight-forward branch road in step S13 (step S157). In this manner, when the number of branch roads is equal to or smaller than the number of exit lanes, the heading direction control is set to every lane.

Figure 7:
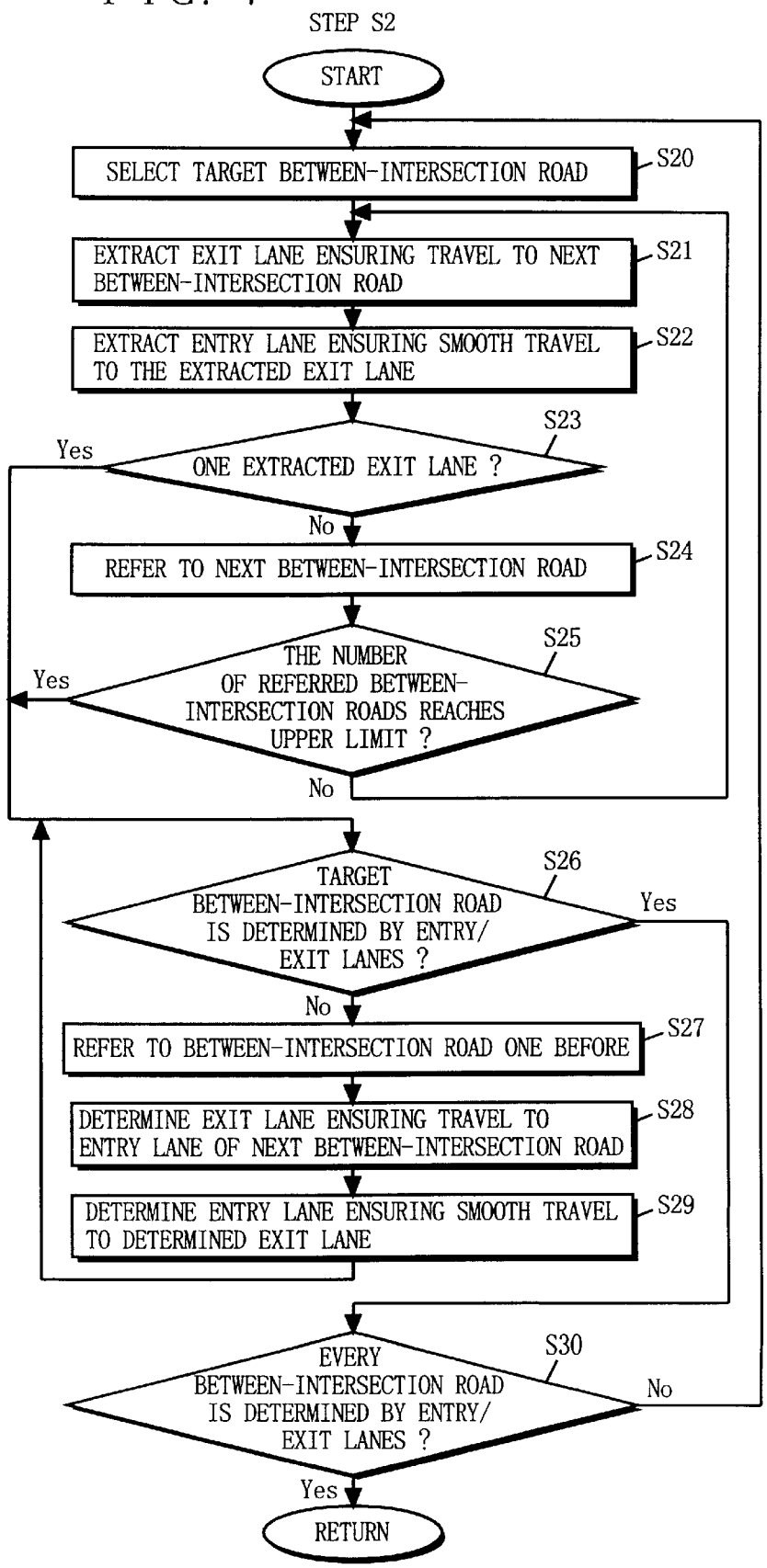
FIG. 7 is a flowchart illustrating subroutine step S2 (between-intersection road's entry/exit lane determination processing) in FIG. 3 in more detail.

FIG. 7 is a detailed flowchart illustrating subroutine step S2 (between-intersection road's entry/exit lane determination processing) in FIG. 3. Hereinafter, by referring to FIG. 7, the operation of subroutine step S2 is described in more detail.

First, in step S20, the lane determination part 52 selects one target between-intersection road among the between-intersection roads on the path. Then, as to the target between-intersection road, the lane determination part 52 extracts any exit lane which ensures the car of travel to the next between-intersection road (step S21). The lane determination part 52 also extracts any entry lane thereof which ensures the car of smooth travel to the exit lane(s) extracted in step S21 (step S22). Herein, "smooth travel" means that the lane change is less often, and the entry lane(s) which allows the smoothest travel to the extracted exit lane(s) is the one extending directly thereto. Note that, as to a road where the number of lanes gets more or less on the way, the entry lane(s) extending to the lane adjacent to the exit lane(s) is also regarded as ensuring smooth travel. In any way, in step S22, with respect to the exit lane(s) extracted in step S21, the entry lane(s) is singularly assigned.

The lane determination part 52 then judges whether or not the number of exit lanes extracted in step S21 is limited to one (step S23). If not, the target between-intersection road may not be uniquely determined by path. Therefore, the lane determination part 52 refers to the next between-intersection road ahead of the target between-intersection road (step S24). Then, the lane determination part 52 judges whether or not the number of referred between-intersection roads has reached a predetermined upper limit (step S25). If not yet, the procedure returns to step S21 so that the lane determination part 52 extracts, as to the currently referring between-intersection road, any exit lane which ensures the car of travel to the following between-intersection road and any entry lane which allows smooth travel to the exit lane(s) (steps S21 and S22). If the number of exit lanes thereof cannot be limited to one (step S23), the lane determination part 52 refers to another between-intersection road still further ahead (step S24). Note that, steps S21 to S24 are repeated until the number of exit lanes is limited to one.

After the number of exit lanes of the target between-intersection road selected in step S20 or the between-intersection road referred in step S24 is limited to one, the procedure goes to step S26. Herein, in step S24, if the lane determination part 52 can keep on making reference to the between-intersection roads far ahead of the target between-intersection road, steps S21 to S24 may be repeated endlessly. Therefore, in this embodiment, an upper limit of reference frequency is exemplarily predetermined as "three between-intersection roads ahead are referred to". Accordingly, when the sequentially-incremented reference frequency reaches the upper limit, such judgement is made in step S25 and the procedure forcefully goes to step S26. In this embodiment, in a case where a plurality of lanes are each considered a possibility for the exit lane even after the reference frequency reached its upper limit in step S25, one of those lanes is arbitrarily selected as the exit lane.

In step S26, the lane determination part 52 judges whether or not the entry/exit lanes of the target between-intersection road selected in step S20 are respectively limited to one. If not (that is, when reference is made not to the target between-intersection road but to any other between-intersection road), the lane determination part 52 refers this time to the between-intersection road one before the between-intersection road lastly referred to in step S24, and the between-intersection road is regarded as a reference between-intersection road (step S27). At this point, as to the between-intersection road lastly referred to in step S24, the entry/exit lanes are respectively limited to one. The lane determination part 52 then determines any exit lane of the reference between-intersection road which ensures the car of travel to the entry lane of the between-intersection road located next thereto (step S28). When the number of exit lanes of the reference between-intersection road and the number of entry lanes of the next between-intersection road are the same, the lane determination part 52 determines, with higher priority, one exit lane having the same lane number as the entry lane as an exit lane of the reference between-intersection road which allows travel to the entry lane of the next between-intersection road. When the number of exit lanes of the reference between-intersection road and the number of entry lanes of the next between-intersection road are not the same, or even if the numbers are the same, when some lane control prohibits travel between lanes having the same lane number, the lane determination part 52 determines one exit lane located closest to the entry lane of the next between-intersection road as an exit lane of the reference between-intersection road which ensures the car of travel thereto. In step S29, the lane determination part 52 determines one entry lane which allows smooth travel to the determined exit lane, and the procedure returns to step S26.

Steps S26 to S29 are repeated until the reference between-intersection road agrees with the target between-intersection road selected in S20, whereby the entry/exit lanes of the target between-intersection road are automatically limited to one, respectively. Such judgement is made in step S26.

In a case where the entry/exit lanes of the target between-intersection road selected in step S20 are respectively limited to one from the beginning, or where the entry/exit lanes thereof are respectively limited to one after the reference between-intersection road being agreed with the target between-intersection road, the lane determination part 52 judges whether or not every between-intersection road on the path is determined by entry/exit lanes (step S30). If not yet, the procedure returns to step S20 so that the lane determination part 52 selects any one of the between-intersection roads without being determined by entry/exit lanes as the target between-intersection road, thereby determining the target between-intersection road by entry/exit lanes.

Steps S20 to S29 are repeated until every between-intersection road on the path is determined by entry/exit lanes, and the lane determination part 52 is now through with step S2.

The operation of the entry/exit lane determination processing in step S2 is described in more detail with a road network model next below.

Figure 8:
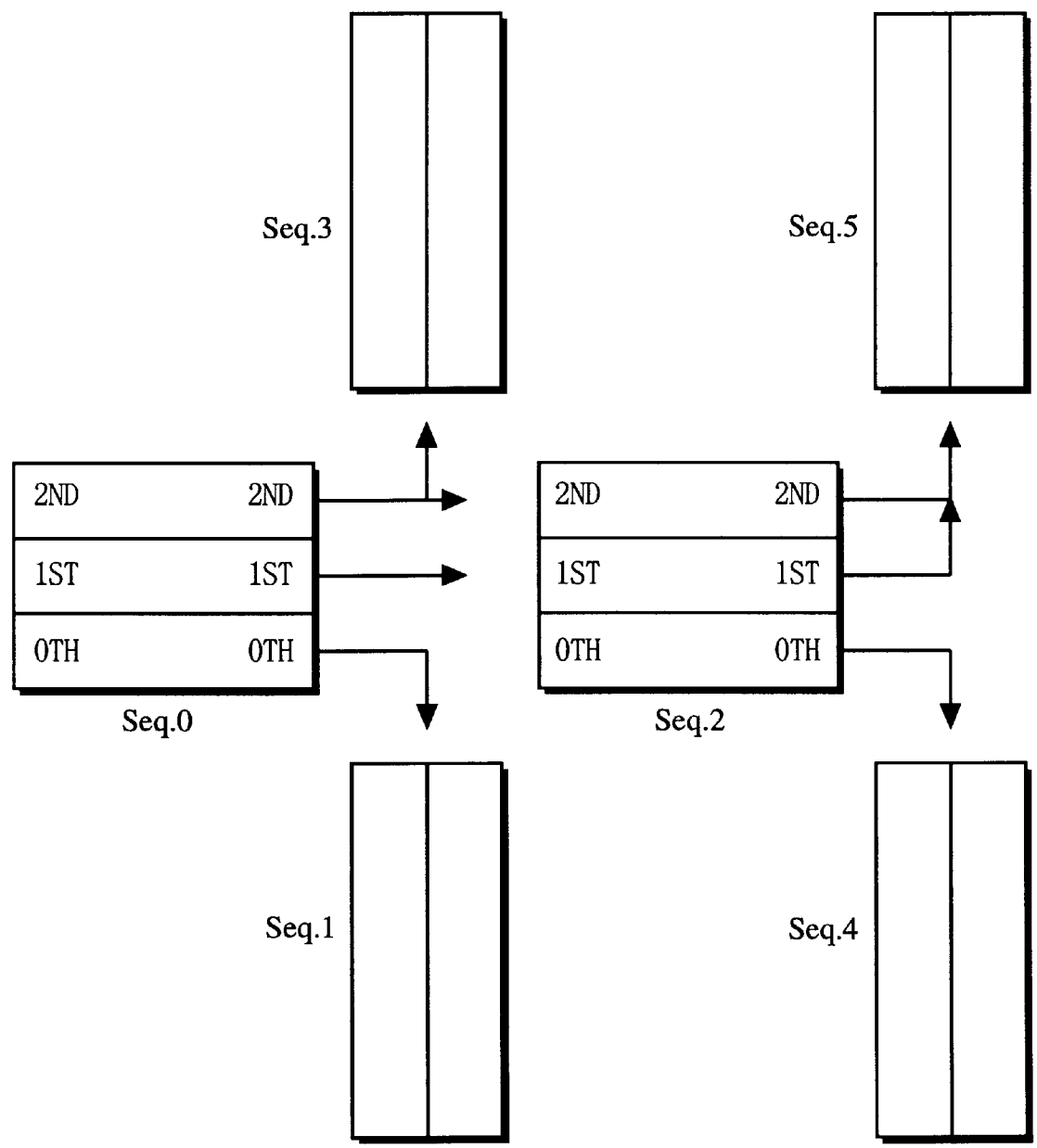
FIG. 8 is a diagram showing an exemplary network of the between-intersection roads.

FIG. 8 is a diagram showing an exemplary network of the between-intersection roads. The between-intersection roads in FIG. 8 are six of Seq. 0 to Seq. 5, and entry/exit lane numbers provided to the between-intersection roads Seq. 0 and Seq. 2 are three of 0 to 2. The 0th exit lane of the between-intersection road Seq. 0 only allows travel to the between-intersection road Seq. 1. The 1st exit lane of the between-intersection road Seq. 0 only allows travel to the between-intersection road Seq. 2. The 2nd exit lane of the between-intersection road Seq. 0 only allows travel to the between-intersection roads Seq. 2 and Seq. 3. The 0th exit lane of the between-intersection road Seq. 2 only allows travel to the between-intersection road Seq. 4. The 1st and 2nd exit lanes of the between-intersection road Seq. 2 only allow travel to the between-intersection road Seq. 5.

Hereinafter, it is described how the between-intersection roads in FIG. 8 are determined by entry/exit lanes. In this example, the description is made on two cases: one is a case where the path is from the between-intersection road Seq. 0 to Seq. 1; and the other is a case where the path is from the between-intersection road Seq. 0 to Seq. 4 via Seq. 2.

First, the case where the path is from the between-intersection road Seq. 0 to Seq. 1 is operationally described. First, in step S20 in FIG. 7, the between-intersection road Seq. 0 is selected as the target between-intersection road. Thereafter, the 0th exit lane thereof is extracted as the one which allows travel to the between-intersection road Seq. 1 (step S21). Then, the 0th entry lane thereof is extracted as the one which allows smooth travel to the 0th exit lane (step S22). As to the between-intersection road Seq. 0, there is only one exit lane which allows travel to the next between-intersection road Seq. 1 (step S23), the procedure therefore goes to step S26. In step S26, the between-intersection road Seq. 0 is already determined by the 0th entry lane and the 0th exit lane. Therefore, the lane determination part 52 is now through with step S2.

Second, the other case where the path is from the between-intersection road Seq. 0 to Seq. 4 via Seq. 2 is described. First, in step S20 in FIG. 7, the between-intersection road Seq. 0 is selected as the target between-intersection road. Then, the 1st and the 2nd exit lanes thereof are extracted as the one which allows travel to the next between-intersection road Seq. 2 (step S21). Thereafter, the 1st and the 2nd entry lanes thereof are respectively extracted as the ones which allow smooth travel to the 1st and the 2nd exit lanes (step S22). There are two exit lanes of the between-intersection road Seq. 0 which allow travel to Seq. 1 (step S23), the procedure therefore goes to step S24. In step S24, the target between-intersection road is changed from the between-intersection road Seq. 0 to Seq. 2, and the procedure returns to step S21 via step S25.

In step S21, only the 0th exit lane of the between-intersection road Seq. 2 is extracted as the one which allows travel to the next between-intersection road Seq. 4. Then, the 0th entry lane thereof is extracted as the one which allows smooth travel to the 0th exit lane (step S22). As to the between-intersection road Seq. 2, there is only one exit lane of which allows travel to the next between-intersection road Seq. 4 (step S23), the procedure therefore goes to step S26. Then, in step S26, the between-intersection road Seq. 0 is not determined by entry/exit lanes, the procedure therefore goes to step S27. Thereafter, the reference between-intersection road is changed to the between-intersection road Seq. 0 (step S27). The 1st exit lane is the one, among the exit lanes of the between-intersection road Seq. 0, which allows smooth travel to the 0th entry lane of the between-intersection road Seq. 2 (step S28). The 1st entry lane of the between-intersection road Seq. 0 is extracted as the one which allows smooth travel to the 1st exit lane (step S29), and the procedure then returns to step S26. In step S26, the between-intersection road Seq. 0 is already determined by the 1st entry lane and the 1st exit lane. Therefore, the lane determination part 52 is now through with step S2.

The guide part 6 generates the lane guidance information in accordance with such determined entry lane and the exit lane, and then presents the lane guidance information to the driver via the output part 7. To be more specific, when the present car location reaches the predetermined distance range before an intersection, the guide part 6 obtains the exit lane of the between-intersection road where the car is and the entry lane of the next between-intersection road from the lane guidance information generation part 5. Thereafter, the guide part 6 reads, from the map data storage part 4, an enlarged diagram of the intersection where the car is supposed to soon pass by, and then displays lane guidance thereon in accordance with the obtained exit and entry lanes. The guide part 6 may generate information for performing the lane guidance with sound, and outputs the sound from the output part 7.

(Second Embodiment)

In the first embodiment in the foregoing, the navigation device determines each between-intersection road on the guidance path by lane by internally analyzing the map data stored in the map data storage 4. On the other hand, in a second embodiment next below, the map data is externally analyzed in advance, and the result is installed on the navigation device as intermediate data. The navigation device refers to the installed intermediate data so as to determine each between-intersection road on the guidance path by lane. According to such second embodiment, the navigation device becomes free from the analysis processing of map data for determining lanes, thereby rendering the load thereof eased.

Figure 9:
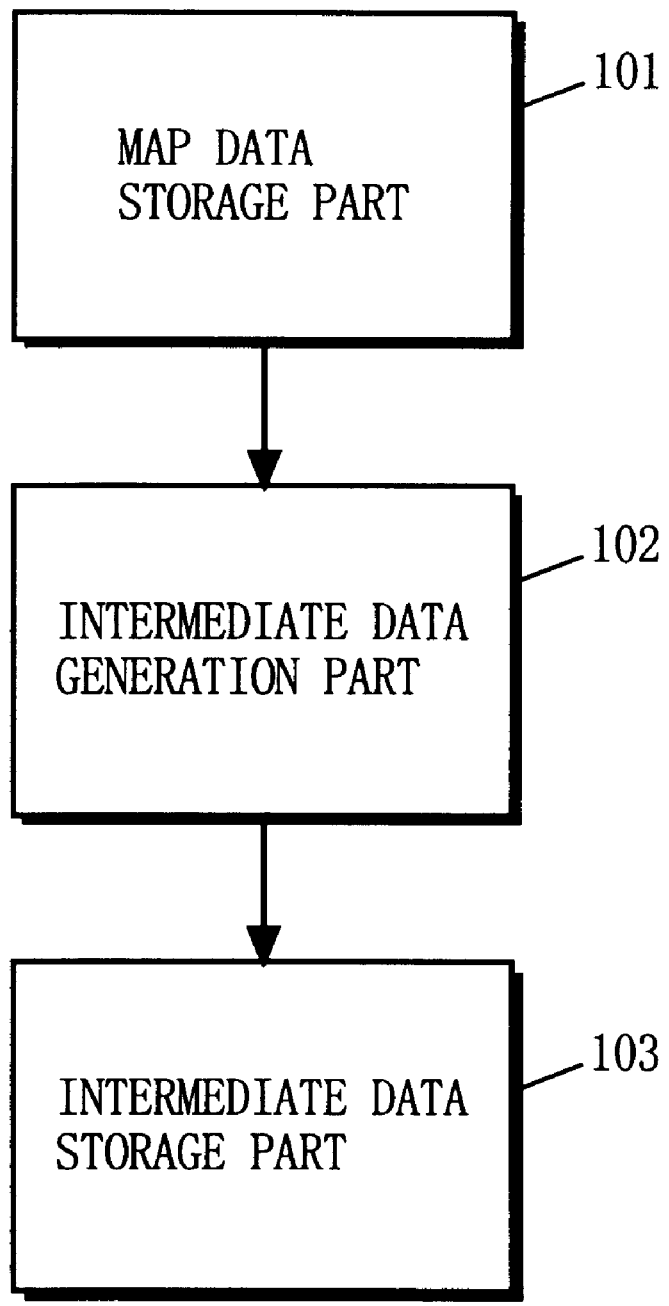
FIG. 9 is a block diagram exemplarily showing the structure of an intermediate data generation device for generating intermediate data used in a second embodiment of the present invention.

FIG. 9 is a block diagram exemplarily showing the structure of an intermediate data generation device for generating the intermediate data used in the second embodiment. Such intermediate data generation device is generally operated on the manufacture side thereof. In FIG. 9, the intermediate data generation device is provided with a map data storage part 101, an intermediate data generation part 102, and an intermediate data storage part 103. The map data storage part 101 is exemplarily structured by an optical disk (e.g., CD. DVD), hard disk, or large-capacity semiconductor memory, and stores information relevant to a road network such as connection, coordinates, shape, attribute, or control information as to intersections and roads. Map data stored in the map data storage part 101 may be either 2D map data or 3D map data. Herein, the map data presumably includes the number of lanes of each road and control information on heading direction for each lane. The intermediate data generation part 102 generates intermediate data according to the map data stored in the map data storage part 101. The intermediate data storage part 103 is exemplarily structured by an optical disk (e.g., CD. DVD), hard disk, or large-capacity semiconductor memory, and stores the intermediate data generated in the intermediate data generation part 102.

Figure 10:
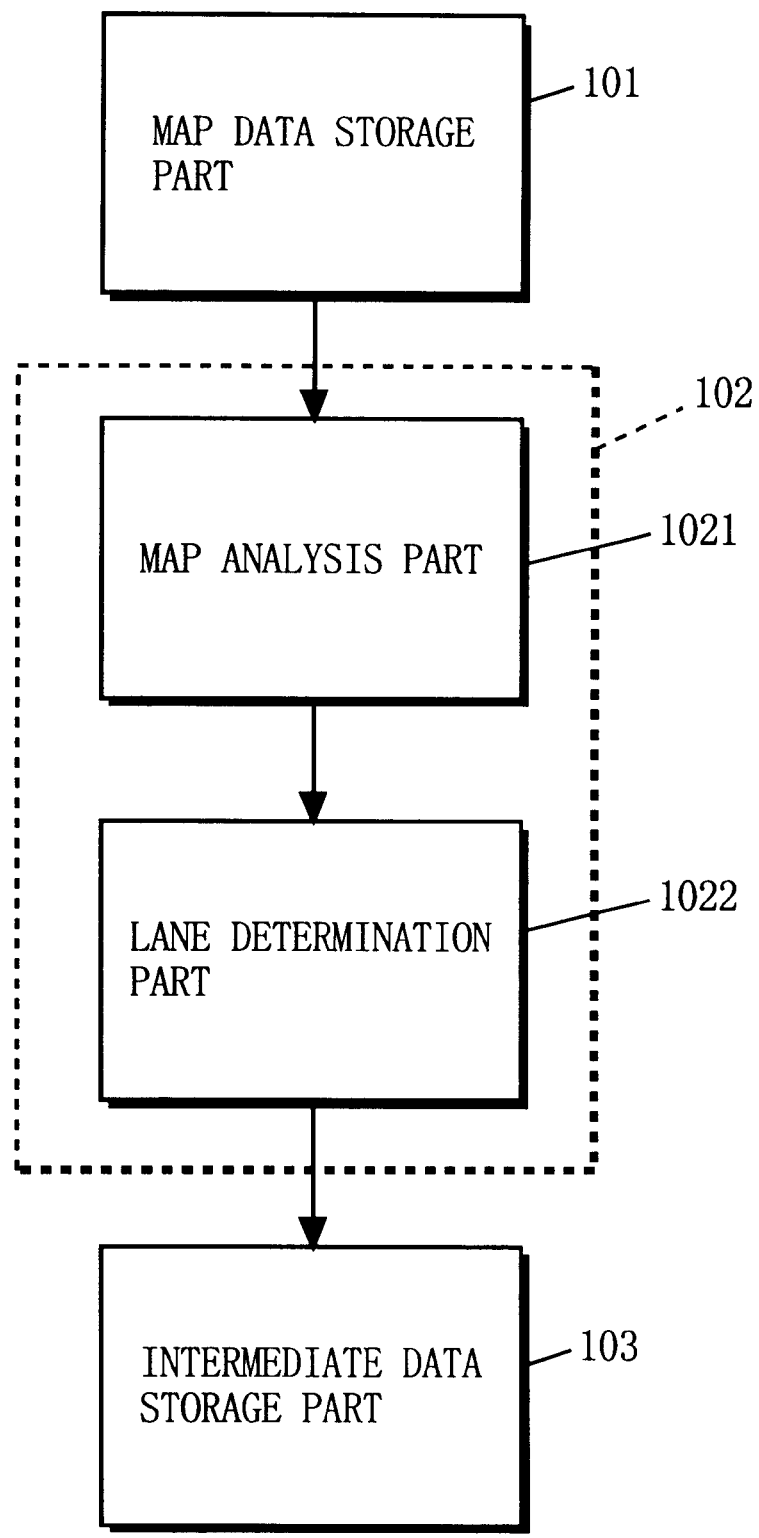
FIG. 10 is a block diagram showing the detailed structure of an intermediate data generation part 102 in the intermediate data generation device in FIG. 9.

FIG. 10 is a block diagram showing the detailed structure of the intermediate data generation part 102 in the intermediate data generation device in FIG. 9. In FIG. 10, the intermediate data generation part 102 includes a map analysis part 1021 and a lane determination part 1022. The map analysis part 1021 analyzes the map data stored in the map data storage part 101, while the lane determination part 1022 determines each of the roads on the map data by lane according to the analysis result of the map data analysis part 1021.

FIGS. 11 to 15 are flowcharts each illustrating the operation of the intermediate data generation part 102 in FIG. 9. Hereinafter, by referring to FIGS. 11 to 15, the operation of the intermediate data generation part 102 is described.

Figure 11:
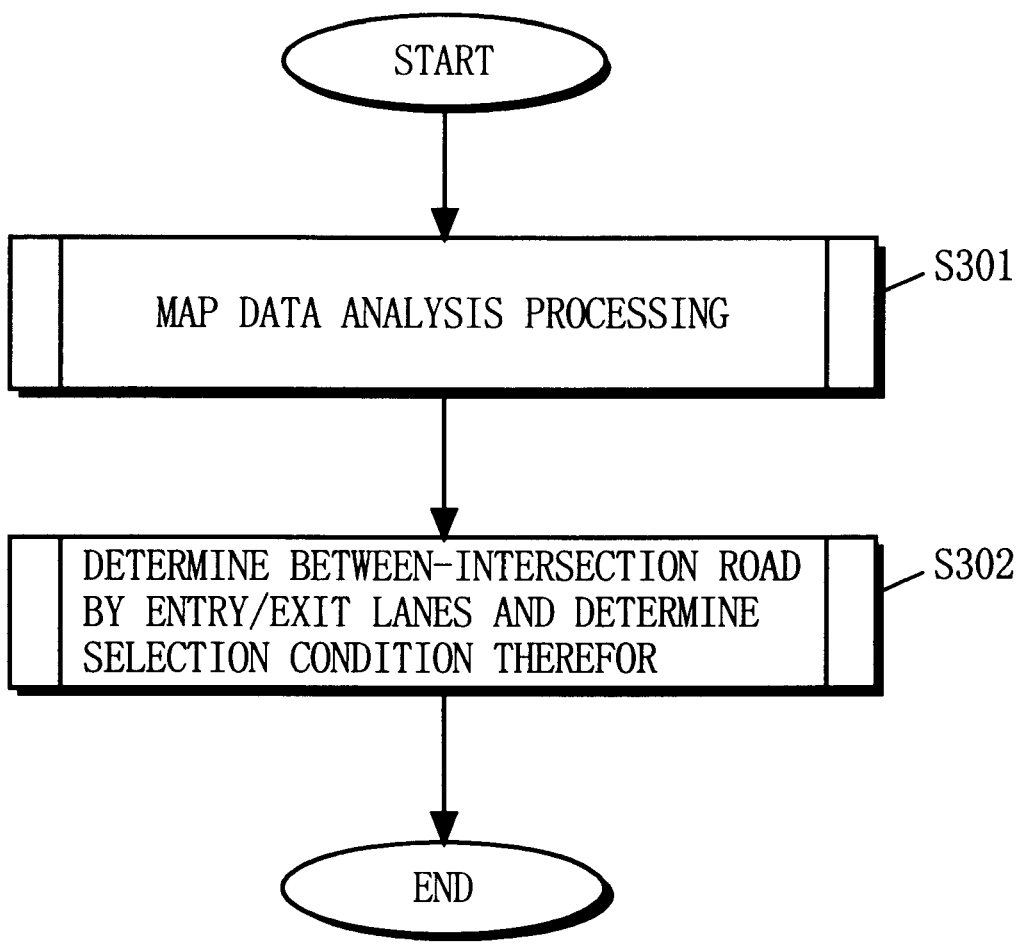
FIG. 11 is a main flowchart illustrating how the intermediate data generation part in FIG. 9 is operated.

First, in step S301 in FIG. 11, the map analysis part 1021 carries out the analysis processing of the map data stored in the map data storage part 101. As is later described, the analysis processing is executed with respect to every between-intersection road on the map data, and a straight-forward branch road is specified thereto and default heading direction control is set to any between-intersection road without having the heading direction control set. Then, the lane determination part 1022 determines every between-intersection road by path between the entry and exit lanes thereof and selection conditions for the path on the basis of the map data to which the analysis processing is executed by the map analysis part 1021 (step S302).

Figure 12:
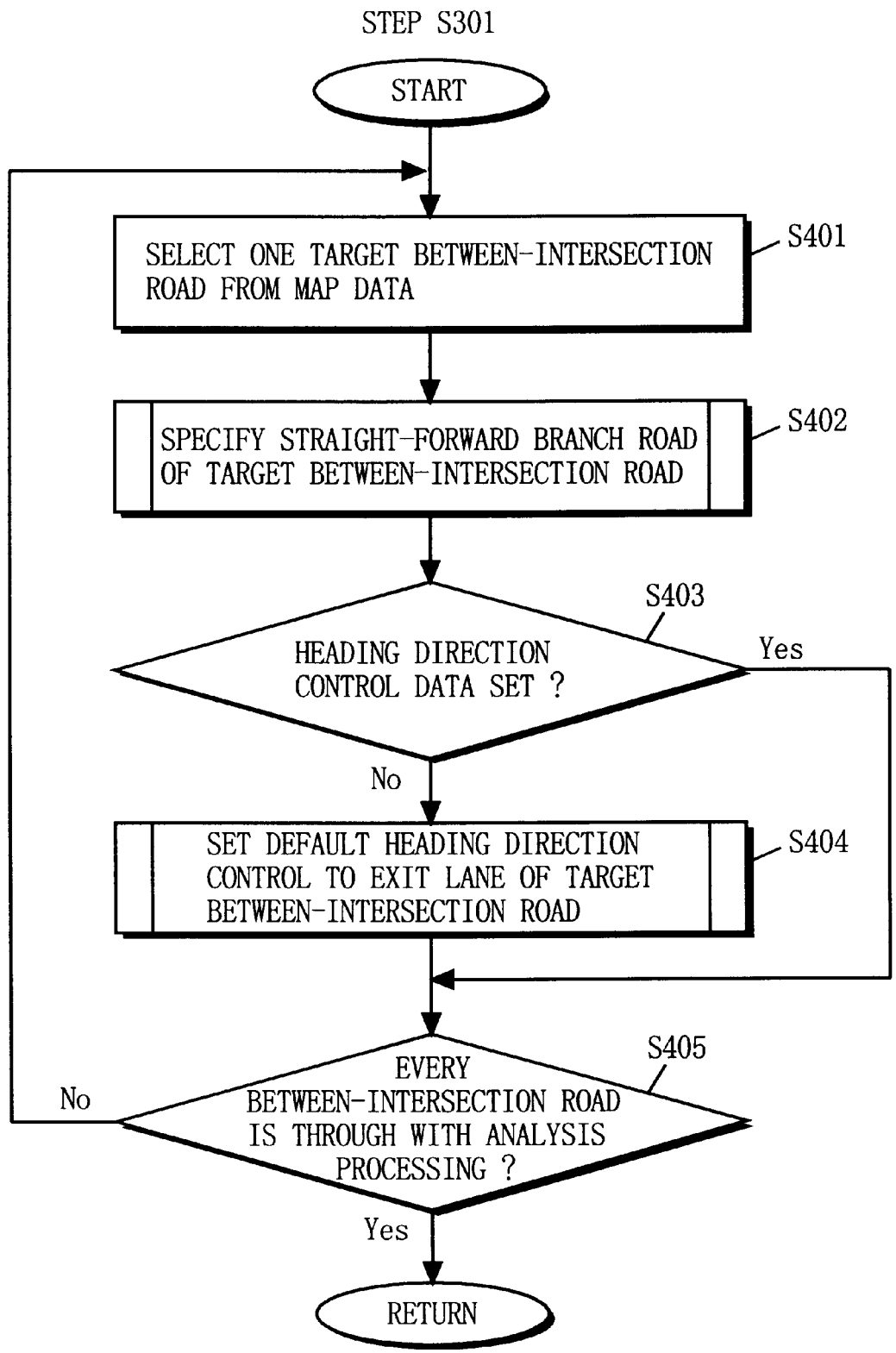
FIG. 12 is a flowchart illustrating subroutine step S301 (map data analysis processing) in FIG. 11 in more detail.

FIG. 12 is a detailed flowchart illustrating subroutine step S301 (map data analysis processing) in FIG. 11. Herein after, by referring to FIG. 12, the operation of subroutine step S301 is described in more detail.

In FIG. 12, the map analysis part 1021 first divides the road network on the map data stored in the map data storage part 101 at intersections so as to take in the road network as a collection of a plurality of between-intersection roads (road between adjacent intersections, or road between intersection and dead end). Thereafter, the map analysis part 1021 selects one between-intersection road targeted among the between-intersection roads (hereinafter, referred to as target between-intersection road)(step S401). The map analysis part 1021 then specifies any branch road assumable to be straight-forward with a view from the end of the target between-intersection road (step S402). The reason of specifying any branch road assumable to be straight-forward is to later determine a branch road for left turn and that for right turn with reference thereto. Basically, step S402 is similar to step S13 in the first embodiment (see FIG. 4), and is carried out in a similar manner to the processing shown in FIG. 5. Then, the map analysis part 1021 judges whether or not heading direction control data is set to the target between-intersection road on the map data (step S403). If not, the map analysis part 1021 sets default heading direction control data thereto (step S404). Step S404 is basically similar to step S15 in the first embodiment (see FIG. 4), and is carried out in a similar manner to the processing shown in FIG. 6. If the heading direction control data is set to the target between-intersection road, on the other hand, step S404 is skipped. Thereafter, the map analysis part 1021 judges whether or not every between-intersection road on the map data is through with the analysis processing (step S405). When there is any between-intersection road which is not through with the analysis processing, the procedure returns to step S401 so that the map data analysis part 1021 sequentially executes the analysis processing thereto. After every between-intersection road is through with the analysis processing, the map data analysis part 1021 terminates the operation.

Figure 13:
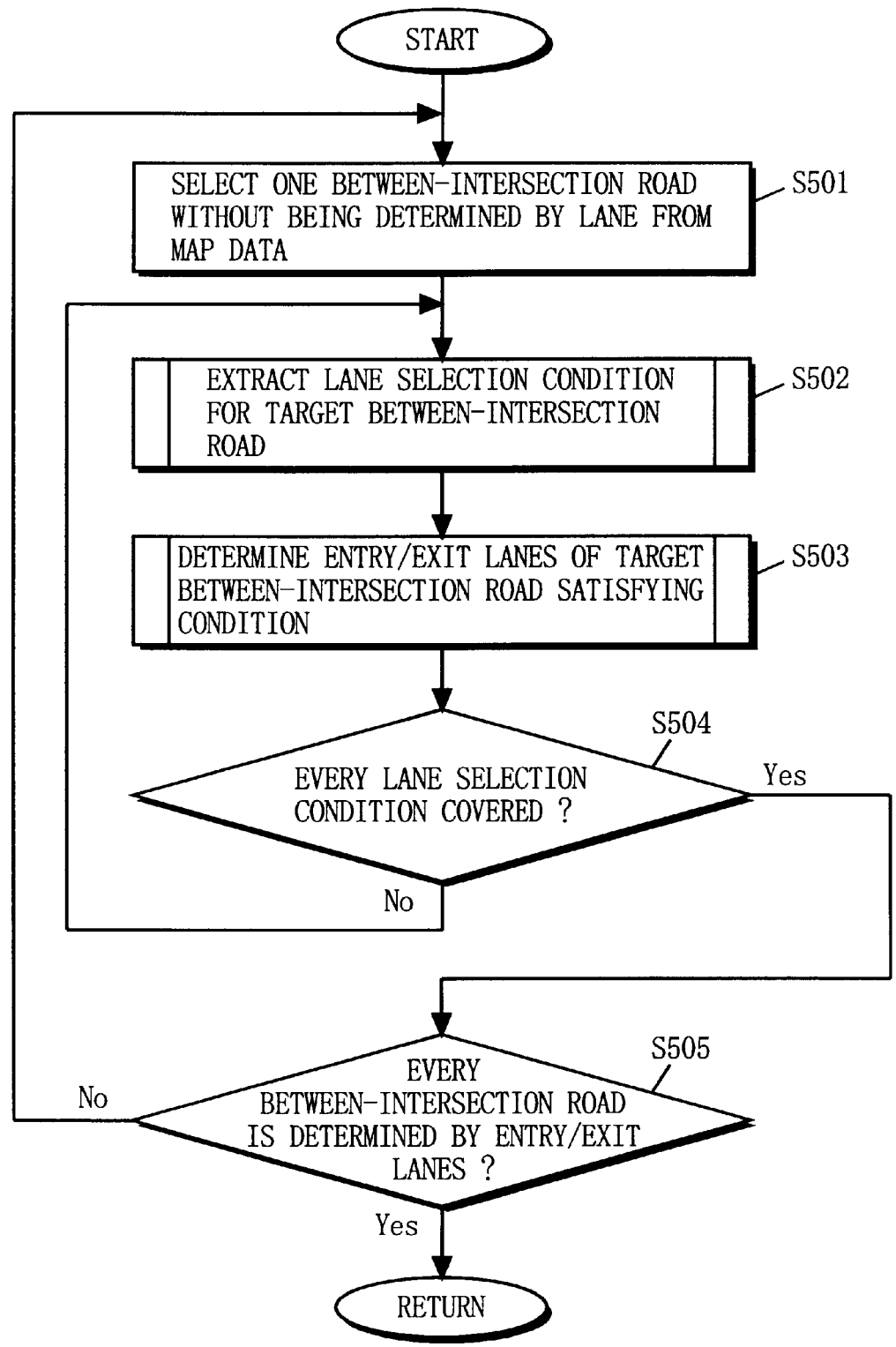
FIG. 13 is a flowchart illustrating subroutine step S302 (between-intersection road's lane selection condition and condition-satisfying entry/exit lane determination processing) in FIG. 11 in more detail.

FIG. 13 is a detailed flowchart illustrating subroutine step S302 in FIG. 11. Hereinafter, by referring to FIG. 13, the operation of subroutine step S302 is described in more detail.

In FIG. 13, the lane determination part 1022 selects, from the map data stored in the map data storage part 101, one between-intersection road which is not yet determined by lane (step S501). Then, the lane determination part 1022 determines lane selection conditions for the between-intersection road selected in step S501, that is, the target between-intersection road (step S502). The details of the processing are described later. The lane determination part 1022 determines entry/exit lanes of the target between-intersection road satisfying the lane selection conditions extracted in step S502 (step S503). The details of the processing are described later. The lane determination part 1022 then judges whether or not every lane selection condition for the current target between-intersection road is extracted, and whether or not the entry/exit lanes corresponding thereto are determined (step S504). If there is any lane selection condition not yet extracted, steps S502 and S503 are repeated again. If every lane selection condition for the target between-intersection road is extracted, and if the entry/exit lanes corresponding thereto are determined, the lane determination part 1022 then judges whether or not every between-intersection road on the map data is determined by entry/exit lanes (step S505). If not yet, the procedure returns to step S501 so that the lane determination part 1022 selects one target between-intersection road among the between-intersection roads without being determined by entry/exit lanes, and step S502 and S503 are carried out thereto. Steps S501 to S504 are repeated until every between-intersection road on the map data is determined by entry/exit lanes, the lane determination part 1022 terminates the processing.

Figure 14:
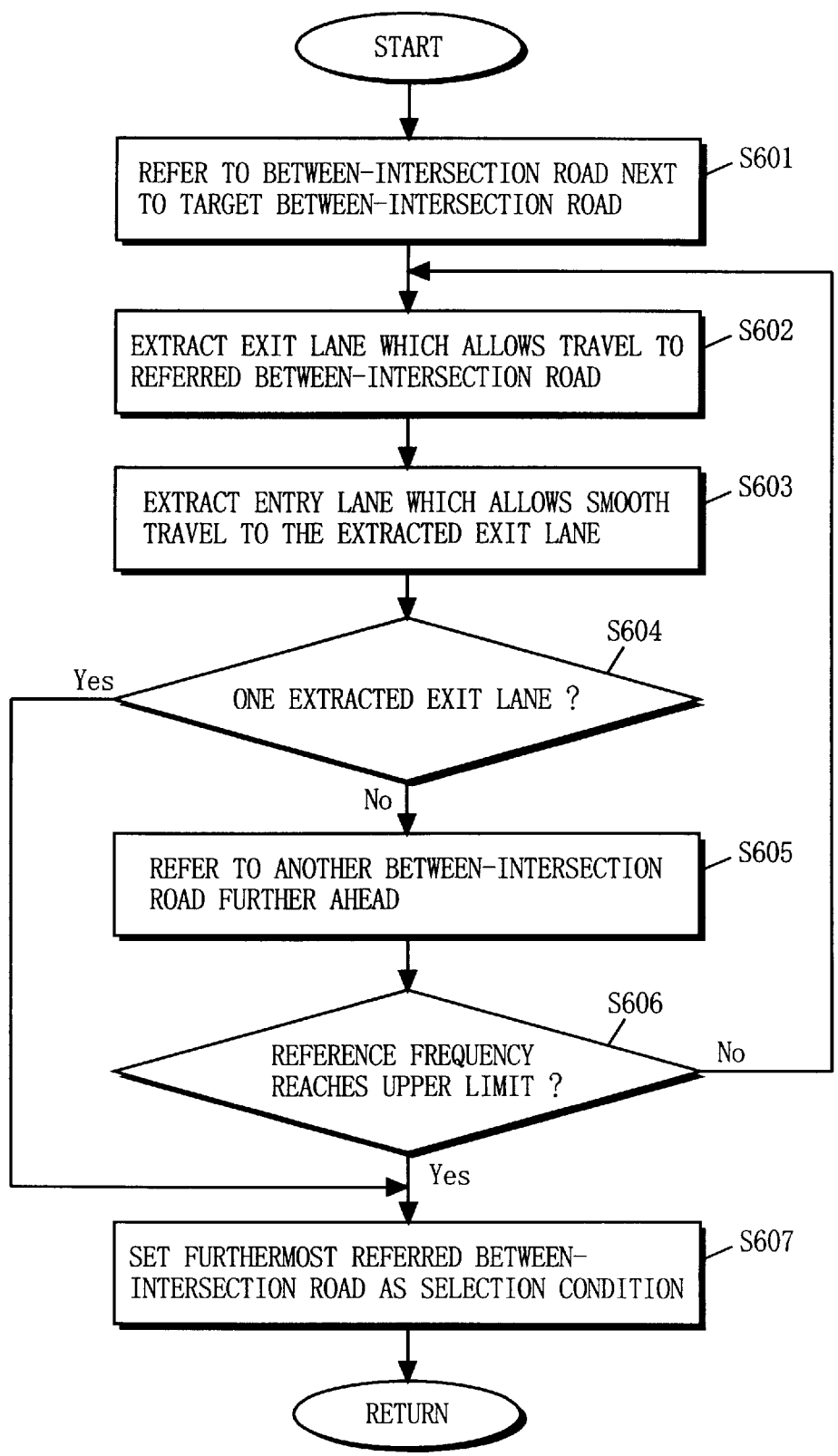
FIG. 14 is a flowchart illustrating subroutine step S502 (target between-intersection road's lane selection condition extraction processing) in FIG. 13 in more detail.

FIG. 14 shows subroutine step S502 (target between-intersection road's lane selection condition extraction processing) in FIG. 13 in more detail. Hereinafter, by referring to FIG. 14, the operation of subroutine step S502 is described in more detail.

In FIG. 14, the lane determination part 1022 selects and refers to one between-intersection road among the ones connected to the exit lanes of the target between-intersection road selected in step S501 (see FIG. 13) (step S601). Then, the lane determination part 1022 extracts any exit lane of the target between-intersection road which allows travel to the between-intersection road referred to in step S601 (step S602). The lane determination part 1022 then extracts any entry lane thereof which allows travel to the exit lane(s) referred to in step S602 (step S603). The lane determination part 1022 then judges whether or not the number of exit lanes extracted in step S602 is limited to one (step S604). If not, that is, if there are two or more exit lanes, the lane determination part 1022 changes the reference between-intersection road to the next one (step S605). Specifically, the lane determination part 1022 selects and refers to one between-intersection road among the ones connected to the exit lanes of the between-intersection road extracted in step S601 (step S605). Next, the lane determination part 1022 judges whether or not the number of between-intersection roads referred to so far has reached a predetermined upper limit (step S606). If not yet, the procedure returns to step S602 so that the lane determination part 1022 extracts, as to the between-intersection road lastly referred to, any exit lane which allows travel to the between-intersection road currently being referred to and any entry lane which allows smooth travel to the exit lane(s) (steps S602 and S603). Steps S602 to S606 are repeated until the number of exit lanes extracted in step S602 is limited to one, and the procedure goes to step S607. Herein, if the lane determination part 1022 can keep on making reference to the between-intersection roads far ahead of the target between-intersection road, steps S602 to S606 may be repeated endlessly. Therefore, in this embodiment, an upper limit of reference frequency is exemplarily predetermined as "three between-intersection roads ahead are referred to". Accordingly, when the sequentially-incremented reference frequency reaches the upper limit, such judgement is made in step S606 and the procedure forcefully goes to step S607. In this embodiment, in a case where a plurality of lanes are each considered a possibility for the exit lane even after the reference frequency reached its upper limit in step S606, one of those lanes is arbitrarily selected as the exit lane. In step S607, the lane determination part 1022 then sets the referred between-intersection road furthermost ahead to an intermediate data setting table (see FIG. 17) as one selection condition for the target between-intersection road. Thereafter, the procedure returns to step S503 in FIG. 13.

Figure 15:
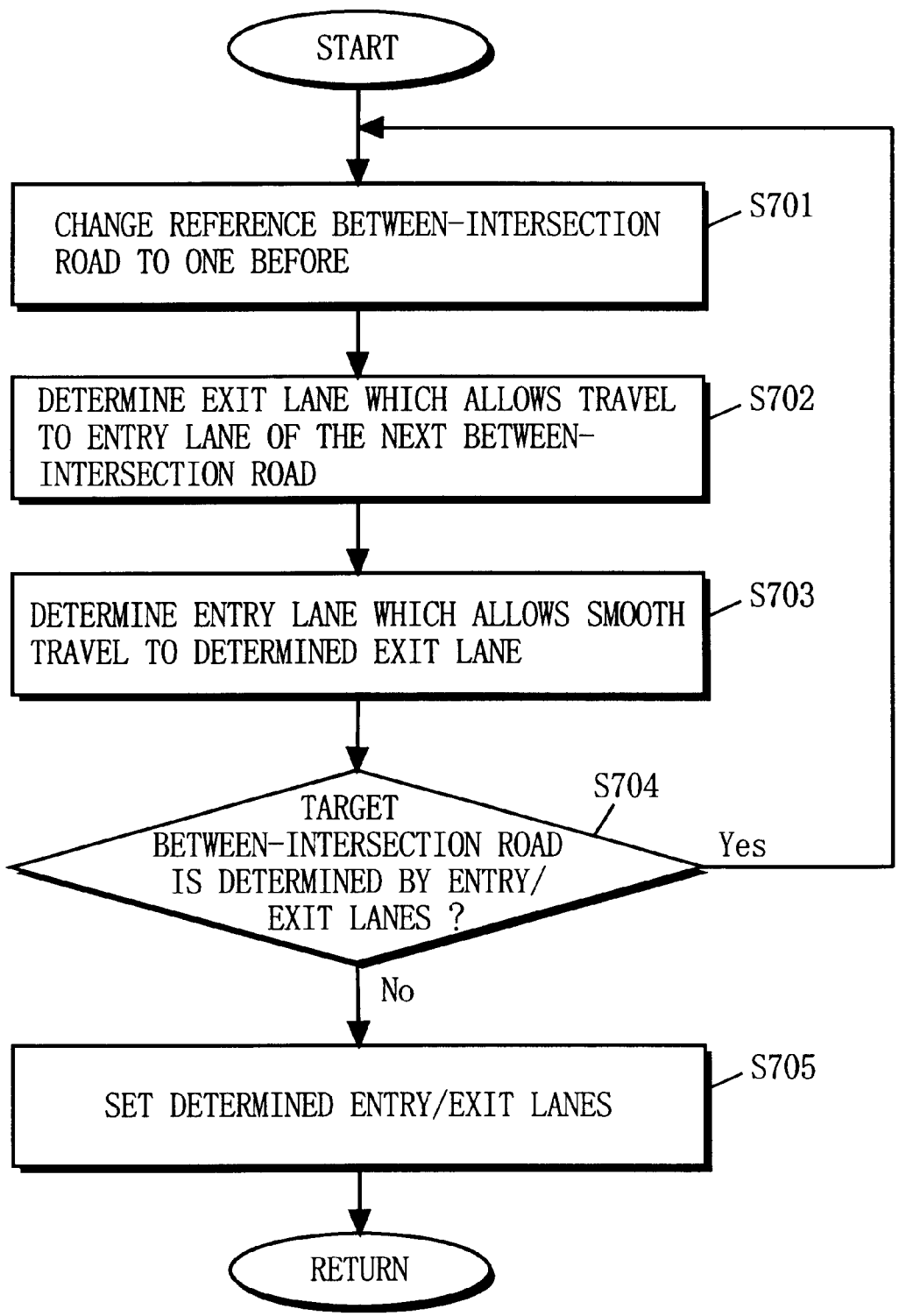
FIG. 15 is a flowchart illustrating subroutine step S503 (lane selection condition satisfying entry/exit lane determination processing) in FIG. 13 in more detail.

FIG. 15 shows subroutine step S503 (entry/exit lane determination processing) in FIG. 13 in detail. Hereinafter, by referring to FIG. 15, the operation of subroutine step S503 is described in more detail. In FIG. 15, the lane determination part 1022 refers this time to the between-intersection road one before the between-intersection road lastly referred to in step S502 (step S701). At this point, as to the between-intersection road lastly referred to, the entry/exit lanes are respectively limited to one. The lane determination part 1022 then determines any exit lane of the between-intersection road currently referring to (hereinafter, referred to as reference between-intersection road) which ensures the car of travel to the entry lane of the between-intersection road located next thereto (step S702). When the number of exit lanes of the reference between-intersection road and the number of entry lanes of the next between-intersection road are the same, the lane determination part 1022 determines, with higher priority, one exit lane having the same lane number as the entry lane as an exit lane of the reference between-intersection road which allows travel to the entry lane of the next between-intersection road. When the number of exit lanes of the reference between-intersection road and the number of entry lanes of the next between-intersection road are not the same, or even if the numbers are the same, when some lane control prohibits travel between lanes having the same lane number, the lane determination part 1022 determines one exit lane located closest to the entry lane of the next between-intersection road as an exit lane of the reference between-intersection road which ensures the car of travel thereto. The lane determination part 1022 then determines an entry lane which allows smooth travel to the determined exit lane (step S703). Thereafter, the lane determination part 1022 judges whether or not the target between-intersection road selected in step S501 (see FIG. 13) is determined by entry/exit lanes (step S704). If not, the procedure returns to step S701 so that the lane determination part 1022 changes the reference between-intersection road to the one before, and then determines the road by the entry/exit lanes. After the target between-intersection road is determined by the entry/exit lanes, the lane determination part 1022 sets the determined entry/exit lanes to the intermediate data setting table (see FIG. 17) (step S705), then the procedure returns to step S504 in FIG. 13.

Thereafter, the lane determination part 1022 repeats, with respect to the target between-intersection road, the processing of extracting the lane selection conditions (step S502) and the processing of determining entry/exit lanes corresponding thereto (step S503). After every processing is through for one target between-intersection road, the lane determination part 1022 changes the target between-intersection road to any other between-intersection road without being determined by lane (step S501), whereby every target between-intersection road is determined by entry/exit lanes.

The operation of the entry/exit lane determination processing in step S302 is described in more detail with a road network model next below.

FIG. 16 is a diagram showing an exemplary network of the between-intersection roads. The between-intersection roads in FIG. 16 are six of Seq. 0 to Seq. 5, and entry/exit lane numbers found in the between-intersection road Seq. 0 are three of 0 to 2. Entry/exit lane numbers found in the between-intersection road Seq. 2 are two of 0 to 1. The 0th exit lane of the between-intersection road Seq. 0 only allows travel to Seq. 1. The 1st exit lane of the between-intersection road Seq. 0 only allows travel to Seq. 2. The 2nd exit lane of the between-intersection road Seq. 0 only allows travel to Seq. 2 and Seq. 3. The 0th exit lane of the between-intersection road Seq. 2 only allows travel to Seq. 4. The 1st exit lane of the between-intersection road Seq. 2 only allows travel to Seq. 5.

Hereinafter, it is exemplarily described how the between intersection roads Seq. 0 and Seq. 2 are both subjected to the lane selection condition extraction processing and the entry/exit lane determination processing corresponding thereto. FIG. 17 shows the intermediate data setting table to which the lane selection conditions for the between-intersection roads Seq. 0 and Seq. 2 and the entry/exit lanes corresponding thereto are set.

First, it is described a case where the between-intersection road Seq. 0 is the target between-intersection road. In this case, in step S501 in FIG. 13, the between-intersection road Seq. 0 is selected as the target between-intersection road, and then the between-intersection road located next thereto is referred to (step S601). If this is the case, although the between-intersection road next to Seq. 0 may be Seq. 1, Seq. 2, and Seq. 3, the between-intersection road Seq. 1 is presumably referred to in this example. As to the between-intersection road Seq. 0, the 0th exit lane is only extracted as the one which allows travel to the next between-intersection road seq. 1 (step S602). Next, the 0th entry lane thereof is extracted as the one which allows smooth travel to the 0th exit lane (step S603). As is known from this, as to the between-intersection road Seq. 0, there is only one exit lane which ensures the car of travel to the next between-intersection road Seq. 1 (step S604). Thus, the between-intersection road Seq. 1 is set as the lane selection conditions (step S607), and (0, 0) is set to the corresponding entry/exit lanes (step S705).

Thereafter, it is described a case where the between-intersection road Seq. 3 is referred to as the one located next to the between-intersection road Seq. 0 (step S601). In this case, the 2nd exit lane of the between-intersection road Seq. 0 is only extracted as the one which allows travel to the next between-intersection road Seq. 3 (step S602), and the 2nd entry lane thereof is extracted as the one which allows smooth travel to the 2nd exit lane (step S603). As to the between-intersection road Seq. 0, there is thus only one exit lane which allows travel to the next between-intersection road Seq. 3 as is in the case where the between-intersection road Seq. 1 is referred to (step S604), the between-intersection road Seq. 3 is set as the lane selection condition (step S607), and (2, 2) is set to the corresponding entry/exit lanes (step S705).

Next, it is described a case where the between-intersection road Seq. 2 is referred to as the one located next to the between-intersection road Seq. 0 (step S601). In this case, the 1st and the 2nd exit lanes of the between-intersection road Seq. 0 are extracted as the ones which allow travel to the next between-intersection road Seq. 2 (step S602). As to the between-intersection road Seq. 0, there are thus a plurality of exit lanes (in this example, two) which allow travel to Seq. 2 (step S604), another between-intersection road is further referred to (step S605). The between-intersection road for the next reference may be Seq. 4 and Seq. 5, and a case where the between-intersection road Seq. 4 is referred to is first described. In this case, only the 0th exit lane is extracted as the one which allows travel from Seq. 2 to Seq. 4 (step S602), and the 0th entry lane is extracted as the one which allows travel to the 0th exit lane (step S603). There is only one exit lane which allows travel from Seq. 2 to Seq. 4 (step S604), the between-intersection road Seq. 4 is thus set as the lane selection condition (step S607). Thereafter, the reference between-intersection road is changed from Seq. 4 to Seq. 2 one road before (step S701), and (0, 0) is set to the entry/exit lanes which allow travel to Seq. 4 (steps S702 and S703). Moreover, the reference between-intersection road is changed from Seq. 2 to Seq. 0 one road before (step S701), and (1, 1) is set to the entry/exit lanes which allow travel to the 0th entry lane of Seq. 2 (steps S702 and S703). Since the between-intersection road Seq. 0 which is currently referred to is the target between-intersection road, such judgement is made in step S704, and (1, 1) is set, as the entry/exit lanes, to the between-intersection road Seq. 4 being the lane selection condition (step S705). In the other case where the between-intersection road Seq. 5 is referred to as the one next to Seq. 2 (step S605), the 1st exit lane of the between-intersection road Seq. 2 is only extracted as the one which allows travel to Seq. 5 (step S602), and the 1st entry lane thereof is extracted as the one which allows smooth travel to the 1st exit lane (step S603). As to the between-intersection road Seq. 2, there is thus only one exit lane which allows travel to Seq. 5 (step S604), the between-intersection road Seq. 5 is set as the lane selection condition (step S607). Thereafter, the reference between-intersection road is changed from Seq. 5 to Seq. 2 one road before (step S701), and (1, 1) is set to the entry/exit lanes which allow travel to Seq. 5 (steps S702 and S703). Moreover, the reference between-intersection road is changed from Seq. 2 to Seq. 0 one road before (step S701), and (2, 2) is set to the entry/exit lanes which allow travel to the 1st entry lane of Seq. 2 (steps S702 and S703). Since the between-intersection road Seq. 0 which is currently referred to is the target between-intersection road, such judgement is made in step S704, and (2, 2) is set, as the entry/exit lanes, to the between-intersection road Seq. 5 being the lane selection conditions (step S705).

Next, it is operationally described a case where the between-intersection road Seq. 2 is regarded as the target between-intersection road. In this case, the between-intersection road referred to in step S601 may be Seq. 4 and Seq. 5. No matter which lane is referred to, the target between-intersection road is uniquely determined by entry/exit lanes, and thus the lane selection conditions for the between-intersection road Seq. 2 are Seq. 4 and Seq. 5. When Seq. 4 is the lane selection condition, (0, 0) is set to the entry/exit lanes, while (1, 1) is set thereto when Seq. 5 is the lane selection condition.

In such manner, the lane selection conditions for each target between-intersection road and the entry/exit lanes corresponding thereto are set to the intermediate data setting table. This intermediate data setting table is stored in the intermediate data storage part 103.

Figure 18:
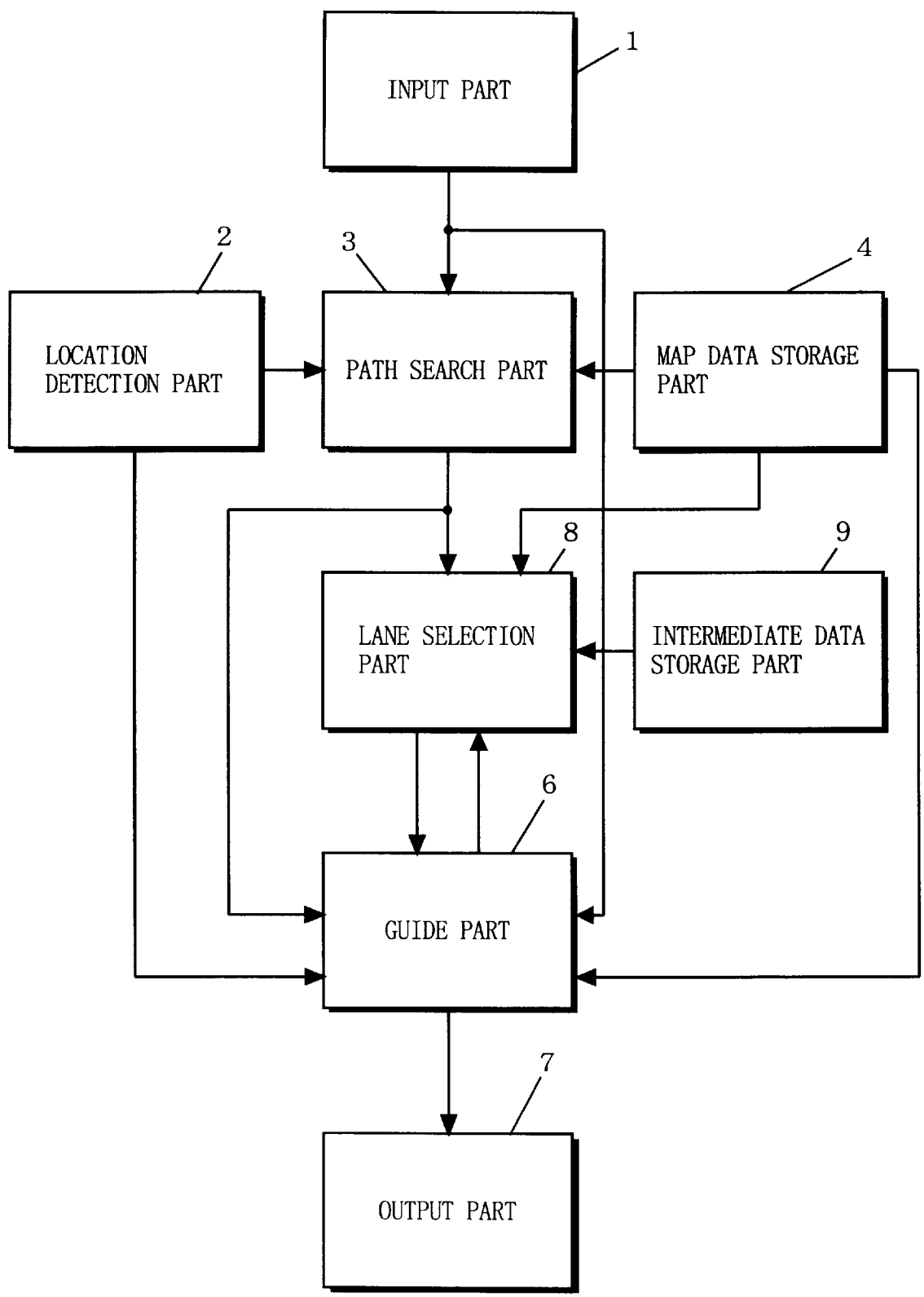
FIG. 18 is a block diagram showing the structure of a navigation device according to the second embodiment of the present invention.

FIG. 18 is a block diagram showing the structure of the navigation device according to the second embodiment of the present invention. In FIG. 18, the navigation device of this embodiment is provided with the input part 1, the location detection part 2, the path search part 3, the map data storage part 4, the guide part 6, the output part 7, a lane selection part 8, and an intermediate data storage part 9.

The input part 1, the location detection part 2, the path search part 3, the map data storage part 4, the guide part 6, and the output part 7 are functionally and structurally the same as the corresponding ones in FIG. 1. Therefore, these constituents are not described again.

The intermediate data storage part 9 stores the intermediate data generated in such intermediate data generation device in FIG. 9.

The lane determination part 8 selects and reads, in accordance with the path information provided from the path search part 3 and the map data read from the map data storage part 4, the corresponding lane selection conditions and the entry/exit lanes from the intermediate data storage part 9, and then generates lane guidance information. The generated lane guidance information is provided to the guide part 6.

FIG. 19 is a detailed flowchart illustrating the operation of the lane selection part 8 in FIG. 18. Hereinafter, by referring to FIG. 19, the operation of the lane selection part 8 is described in more detail.

The lane selection part 8 first receives the path searched in the path search part 3, and divides the path into between-intersection roads (step S801). Then, the lane selection part 8 selects one between-intersection road among the ones on the path as the target between-intersection road (step S802). The between-intersection road first selected is the one closest to the starting point of the path. The lane selection part 8 then reads the intermediate data relevant to the target between-intersection road selected in step S802 from the intermediate data storage part 9 (step S803). The lane selection part 8 then refers to another target between-intersection road ahead of the target between-intersection road on the path, and then selects, from the intermediate data read in step S803, lane information about the lane selection conditions matched to the referred between-intersection road (step S804). The lane selection part 8 then determines the entry/exit lanes included in the lane information selected in step S804 as the entry/exit lanes of the target between-intersection road (step S805). The lane selection part 8 next judges whether or not every between-intersection road on the path is determined by entry/exit lanes (step S806). If not yet, the procedure returns to step S802, and steps S802 to S805 are repeated until every between-intersection road is determined by guiding lane.

As described in the foregoing, according to the navigation device of the second embodiment, every between-intersection road forming the path can be determined by guiding lane only by reading the lane information about the lane selection conditions each matching thereto. Therefore, compared with the navigation device of the first embodiment, the load of the processing can be eased.

Note that, the path search part 3, the lane guidance information generation part 5, and the guide part 6 in the first embodiment, and the path search part 3, the lane selection part 8, and the guide part 6 in the second embodiment can be functionally realized by software control by the CPU. If this is the case, a recording medium on which a program for the software control is recorded is installed on the navigation device.

While the invention has been described in detail, the foregoing description is in all aspects illustrative and not restrictive. It is understood that numerous other modifications and variations can be devised without departing from the scope of the invention.

What is claimed is:

1. A navigation device of a type guiding a car between any two locations arbitrarily designated on a map, the device comprising:

a map data storage part for storing map data;

a path search part for searching a guidance path between said two locations according to said map data;

a lane guidance information generation part for generating, according to said map data, lane guidance information for a car about which lane to take on said guidance path;

a guidance information generation part for generating guidance information relevant to path and lane according to said guidance path and said lane guidance information; and an output part for outputting said guidance information perceivably for a driver, wherein said lane guidance information generation part comprises:
a map analysis part for taking in said guidance path as a plurality of between-intersection roads by dividing the guidance path at intersections; and
a lane determination part for determining, by selecting the between-intersection roads on said guidance path one by one for a target between-intersection road and then referring to said map data on said between-intersection road basis, the selected target between-intersection road by lane, wherein said lane determination part keeps on making reference to said map data from said selected target between-intersection road to other between-intersection roads ahead on said guidance path until the target between-intersection road can be judged as being uniquely determined by lane.

2. The navigation device as claimed in claim 1, wherein every time reference to said map data is made to any other between-intersection road located next, said lane determination part extracts any exit lane which ensures the car of travel thereto from the between-intersection road one before, and when the number of extracted exit lanes is limited to one, judges that said target between-intersection road can be uniquely determined by lane.

3. The navigation device as claimed in claim 2, wherein said lane determination part uniquely determines said target between-intersection road by lane by tracing said extracted exit lanes from the between-intersection road lastly referred to back to said target between-intersection road.

4. The navigation device as claimed in claim 2, wherein said lane determination part predetermines an upper limit of reference frequency with respect to the between-intersection roads, stops reference to the map data when the reference frequency reaches the upper limit thereof, and then forcefully selects one exit lane, which ensures travel to the between-intersection road located furthermost when reference to the map data is stopped, out of the exit lanes of the between-intersection road one before.

5. The navigation device as claimed in claim 1, wherein said map analysis part further
   judges whether or not the between-intersection roads on said guidance path are each provided with heading direction control for exit lanes thereof on said map data, and
   when any between-intersection road is judged as being not provided with the heading direction control, provides default heading direction control for the exit lanes thereof, wherein
said lane determination part determines each of said between-intersection roads by lane by referring to said provided default heading direction control together with said map data.

6. The navigation device as claimed in claim 5, wherein, when said default heading direction control is provided, said map analysis part
   specifies, as to each between-intersection road without the heading direction control, a branch road assumable to be straight-forward among others connected thereto, and
   assigns the exit lanes of each between-intersection road without the heading direction control to the branch roads with reference to said branch road assumed to be straight-forward.

7. The navigation device as claimed in claim 6, wherein said map analysis part specifies, as said branch road assumable to be straight-forward, a road whose connection angle with respect to the between-intersection road without the heading direction control is within a predetermined angle range, which shows the least difference in the number of lanes compared with the exit lanes thereof, and whose connection angle with respect to the between-intersection road without the heading direction control is closest to 180 degrees.

8. The navigation device as claimed in claim 6, wherein said map analysis part changes a method of assigning the exit lanes of the between-intersection road without the heading direction control to the branch roads depending on the number of branch roads connected to the between-intersection road being larger or smaller compared with the number of exit lanes thereof.

9. A method of determining a lane for a car to take when the car is guided along a guidance path searched on map data, the method comprising the steps of:
   taking in said guidance path as a plurality of between-intersection roads by dividing the guidance path at intersections; and
   determining, by selecting the between-intersection roads on said guidance path one by one for a target between-intersection road, and by referring to said map data on said between-intersection road basis, the selected target between-intersection road by lane, wherein
   in said lane determination step, reference to said map data is repeated, one by one, from said selected target between-intersection road to other between-intersection roads ahead on said guidance path until the target between-intersection road can be judged as being uniquely determined by lane.

10. The lane determination method as claimed in claim 9, wherein
    in said lane determination step, every time reference to said map data is made to any other between-intersection road located next, any exit lane which ensures the car of travel thereto is extracted from the between-intersection road one before, and when the number of extracted exit lanes is limited to one, said target between-intersection road can be judged as being uniquely determined by lane.

11. The lane determination method as claimed in claim 10, wherein
    in said lane determination step, said target between-intersection road is uniquely determined by lane by tracing said extracted exit lanes from the between-intersection road lastly referred to back to said target between-intersection road.

12. The lane determination method as claimed in claim 10, wherein
    in said lane determination step, an upper limit of reference frequency for the between-intersection roads is predetermined, reference to the map data is stopped when the reference frequency reaches the upper limit thereof, and one exit lane is forcefully selected from the ones extracted as ensuring travel to the between-intersection road located furthermost when reference to the map data is stopped.

13. The lane determination method as claimed in claim 9, further comprising the steps of:
    judging whether or not the between-intersection roads on said guidance path are each provided with heading direction control for the exit lanes thereof on said map data, and
    when any between-intersection road is judged as being not provided with the heading direction control, providing default heading direction control for the exit lanes thereof, wherein
    in said lane determination step, each of said between-intersection roads is determined by lane by referring to said provided default heading direction control together with said map data.

14. The lane determination method as claimed in claim 13, wherein
    said default heading direction control providing step further comprises the steps of:
      specifying, as to each between-intersection road without the heading direction control, a branch road assumable to be straight-forward among others connected thereto; and
      assigning the exit lanes of each between-intersection road without the heading direction control to the branch roads with reference to said branch road assumed to be straight-forward.

15. The lane determination method as claimed in claim 14, wherein,
    in said specification step, as said branch road assumable to be straight-forward, a road whose connection angle with respect to the between-intersection road without the heading direction control is within a predetermined angle range, which shows the least difference in the number of lanes compared with the exit lanes thereof, and whose connection angle with respect to the between-intersection road without the heading direction control is closest to 180 degrees.

16. The lane determination method as claimed in claim 14, wherein,
in said assignment step, a method of assigning the exit lanes of the between-intersection road without the heading direction control to the branch roads is changed depending on the number of branch roads connected to the between-intersection road being larger or smaller compared with the number of exit lanes thereof.

17. A recording medium on which a program run on a navigation device and for determining a lane for a car to take when the navigation device guides the car along a guidance path searched on map data is recorded, wherein
said program comprises:
a program step of taking in said guidance path as a plurality of between-intersection roads by dividing the guidance path at intersections; and
a program step of determining, by selecting the between-intersection roads on said guidance path one by one for a target between-intersection road, and by referring to said map data on said between-intersection road basis, the selected target between-intersection road by lane, wherein
in said lane determination program step, reference to said map data is repeated, one by one, from said selected target between-intersection road to other between-intersection roads ahead on said guidance path until the target between-intersection road can be judged as being uniquely determined by lane.

18. The recording medium as claimed in claim 17, wherein
in said lane determination program step, every time reference to said map data is made to any other between-intersection road located next, any exit lane which ensures the car of travel thereto is extracted from the between-intersection road one before, and when the number of extracted exit lanes is limited to one, said target between-intersection road can be judged as being uniquely determined by lane.

19. The recording medium as claimed in claim 18, wherein
in said lane determination program step, said target between-intersection road is uniquely determined by lane by tracing said extracted exit lanes from the between-intersection road lastly referred to back to said target between-intersection road.

20. An intermediate data generation device for determining a lane of each road for a car to take when a navigation device guides the car along a path searched, the device comprising:
a map data storage part for storing map data;
a map analysis part for taking in a road network on said map data as a collection of a plurality of between-intersection roads by dividing the road network at intersections; and
a lane determination part for determining, by selecting the between-intersection roads on said map data one by one for a target between-intersection road, and by referring to map data corresponding to the selected target between-intersection road and other between-intersection roads in the vicinity thereof, a lane selection condition for the target between-intersection road and a lane corresponding thereto, wherein
said lane determination part
determines, when reference to said map data is repeated, one by one, from said target between-intersection road and other between-intersection roads therearound, and when the target between-intersection road can be judged as being uniquely determined by lane, the between-intersection road lastly referred to as a lane selection condition therefor, and
determines, when said lane selection condition is determined, the lane of said target between-intersection road corresponding to the lane selection condition.

21. The intermediate data generation device as claimed in claim 20, wherein
every time reference to said map data is made to any other between-intersection road located next, said lane determination part extracts any exit lane which ensures the car of travel thereto from the between-intersection road one before, and when the number of extracted exit lanes is limited to one, judges that said target between-intersection road can be uniquely determined by lane.

22. The intermediate data generation device as claimed in claim 21, wherein
said lane determination part uniquely determines said target between-intersection road by lane by tracing said extracted exit lanes from the between-intersection road determined as being said lane selection condition back to said target between-intersection road.

23. The intermediate data generation device as claimed in claim 21, wherein
said lane determination part predetermines an upper limit of reference frequency for the surrounding between-intersection roads, stops reference to the map data when the reference frequency reaches the upper limit thereof, and then forcefully selects an exit lane from the ones as ensuring travel to the between-intersection road located furthermost when reference to the map data is stopped.

24. The intermediate data generation device as claimed in claim 21, wherein
said map analysis part further
judges whether or not the exit lanes of every between-intersection road on said map data is provided with heading direction control on said map data, and
when any between-intersection road is judged as not being provided with the heading direction control, provides default heading direction control to the exit lanes thereof, wherein
said lane determination part determines each of said between-intersection roads by lane by referring to said provided default heading direction control together with said map data.

25. The intermediate data generation device as claimed in be claim 24, wherein,
when said default heading direction control is provided, said map analysis part
specifies, as to each between-intersection road without the heading direction control, a branch road assumable to be straight-forward among others connected thereto, and
assigns the exit lanes of each between-intersection road without the heading direction control to the branch roads with reference to said branch road assumed to be straight-forward.

26. The intermediate data generation device as claimed in claim 25, wherein
said map analysis part specifies, as said branch road assumable to be straight-forward, a road whose connection angle with respect to the between-intersection road without the heading direction control is within a predetermined angle range, which shows the least difference in the number of lanes compared with the exit lanes thereof, and whose connection angle with respect to the between-intersection road without the heading direction control is closest to 180 degrees.

27. The intermediate data generation device as claimed in claim 25, wherein said map analysis part changes a method of assigning the exit lanes of the between-intersection road without the heading direction control to the branch roads depending on the number of branch roads connected to the between-intersection road being larger or smaller compared with the number of exit lanes thereof.

28. A navigation device for guiding a car between any two locations arbitrarily designated on a map, the device comprising:

a map data storage part for storing map data;

an intermediate data storage part for storing a lane selection condition for each between-intersection road on said map data and lanes corresponding thereto as intermediate data;

a path search part for searching a guidance path between said two locations according to said map data;

a lane selection part for selecting a lane for the car to take as to each of the between-intersection roads on said guidance path according to said intermediate data;

a guidance information generation part for generating guidance information relevant to path and lane according to said guidance path and said selected lane; and an output part for outputting said guidance information perceivably for a driver.

* * * * *